United States Patent
Haynes et al.

(10) Patent No.: US 9,518,391 B2
(45) Date of Patent: Dec. 13, 2016

(54) ROOFING, CLADDING OR SIDING PRODUCT, ITS MANUFACTURE AND ITS USE AS PART OF A SOLAR ENERGY RECOVERY SYSTEM

(71) Applicant: Zinniatek Limited, Rosedale, Auckland (NZ)

(72) Inventors: Andrew Leo Haynes, Auckland (NZ); Ashton Cyril Partridge, Auckland (NZ); John Wason McKee, Auckland (NZ); Christopher Charles Morrow, Auckland (NZ); Samuel Gwynn Buckingham, Auckland (NZ); Johan Miros Kvasnicka, Auckland (NZ); Gabriel Ioan Giurgiu, Auckland (NZ)

(73) Assignee: Zinniatek Limited (NZ)

( * ) Notice: Subject to any disclaimer, the term of this patent is extended or adjusted under 35 U.S.C. 154(b) by 0 days.

(21) Appl. No.: 14/003,741

(22) PCT Filed: Nov. 30, 2012

(86) PCT No.: PCT/NZ2012/000221
§ 371 (c)(1),
(2) Date: Sep. 6, 2013

(87) PCT Pub. No.: WO2013/081477
PCT Pub. Date: Jun. 6, 2013

(65) Prior Publication Data
US 2014/0260000 A1   Sep. 18, 2014

(30) Foreign Application Priority Data
Nov. 30, 2011   (NZ) ........................................ 596793

(51) Int. Cl.
*E04D 13/17*   (2006.01)
*E04D 1/30*   (2006.01)
(Continued)

(52) U.S. Cl.
CPC ................. *E04D 13/17* (2013.01); *E04D 1/30* (2013.01); *E04D 13/00* (2013.01); *F24J 2/4614* (2013.01);
(Continued)

(58) Field of Classification Search
CPC ........ Y02B 10/12; F24J 2/5228; F24J 2/0455; F24J 2/4638; E04D 1/26; E04D 1/30; E04D 1/265; E04D 13/17; E04D 2001/309
(Continued)

(56) References Cited

U.S. PATENT DOCUMENTS 2,624,298 A * 1/1953 Farren ....................... E04D 1/04
52/302.3
4,956,140 A   9/1990 Rolles et al.
(Continued)

FOREIGN PATENT DOCUMENTS

DE   4216171 A1 * 1/1993 ............. E04D 13/18
DE   2020050 02 105   6/2005
(Continued)

OTHER PUBLICATIONS

International Search Report for International Application No. PCT/NZ2012/000221, dated Apr. 3, 2013, 6 pages.
(Continued)

*Primary Examiner* — Babajide Demuren
(74) *Attorney, Agent, or Firm* — Foley & Lardner LLP

(57) ABSTRACT

This disclosure provides a roofing, cladding or siding product which is light weight, easy to install, durable and resistant to environmental wear. One embodiment relates to a module that can be used to form a weatherproof covering over top of a building surface. Another embodiment is a module which can, in additional to forming a weatherproof covering, be used as part of a thermal energy recovery or
(Continued)

removal system. Yet another embodiment is a module which can, in addition to forming a weatherproof covering, and optionally in addition to being useful as part of a thermal energy recovery system, bears an array of solar cells to generate electrical energy. Assemblies, systems, uses, and methods of manufacture are also described.

41 Claims, 40 Drawing Sheets

(51) Int. Cl.
  E04D 13/00 (2006.01)
  F24J 2/52 (2006.01)
  H02S 20/23 (2014.01)
  H02S 20/25 (2014.01)
  H02S 40/44 (2014.01)
  H02S 40/12 (2014.01)
  F24J 2/46 (2006.01)
  F28F 3/04 (2006.01)
  F24J 2/04 (2006.01)
  F24J 2/00 (2014.01)

(52) U.S. Cl.
  CPC ............ $F24J\ 2/5228$ (2013.01); $F24J\ 2/5245$ (2013.01); $F28F\ 3/048$ (2013.01); $H02S\ 20/23$ (2014.12); $H02S\ 20/25$ (2014.12); $H02S\ 40/12$ (2014.12); $H02S\ 40/44$ (2014.12); $E04D\ 2001/309$ (2013.01); $F24J\ 2/045$ (2013.01); $F24J\ 2002/0061$ (2013.01); $Y02B\ 10/12$ (2013.01); $Y02B\ 10/20$ (2013.01); $Y02B\ 10/70$ (2013.01); $Y02E\ 10/47$ (2013.01); $Y02E\ 10/60$ (2013.01); $Y10T\ 29/49623$ (2015.01)

(58) Field of Classification Search
  USPC .. 52/173.3, 518; 136/251, 243, 244; 428/77, 189
  See application file for complete search history.

(56) References Cited

U.S. PATENT DOCUMENTS

| | | | |
|---|---|---|---|
| 5,053,180 A | 10/1991 | Wang et al. | |
| 5,070,671 A * | 12/1991 | Fifield | E04D 1/16 52/533 |
| 5,615,527 A * | 4/1997 | Attley | E04D 1/06 52/518 |
| 5,630,305 A | 5/1997 | Hlasnicek | |
| 5,651,226 A * | 7/1997 | Archibald | 52/518 |
| 6,164,034 A * | 12/2000 | Roetheli | E04D 1/085 428/292.4 |
| 6,220,956 B1 * | 4/2001 | Kilian et al. | 454/239 |
| 6,856,496 B1 * | 2/2005 | Mucci et al. | 361/20 |
| 6,908,295 B2 | 6/2005 | Thielman et al. | |
| 6,941,706 B2 * | 9/2005 | Austin et al. | 52/94 |
| 7,520,098 B1 * | 4/2009 | Martinique | E04D 1/20 52/309.2 |
| 2001/0022055 A1 * | 9/2001 | Zhang | E04D 1/20 52/309.1 |
| 2003/0154667 A1 * | 8/2003 | Dinwoodie | 52/173.3 |
| 2004/0074156 A1 * | 4/2004 | Haynes | E04D 1/36 52/58 |
| 2005/0072092 A1 * | 4/2005 | Williams | E04D 1/22 52/518 |
| 2005/0178429 A1 * | 8/2005 | McCaskill et al. | 136/251 |
| 2005/0239394 A1 * | 10/2005 | O'Hagin et al. | 454/366 |
| 2006/0026908 A1 * | 2/2006 | Gregori | E04D 1/265 52/105 |
| 2008/0000174 A1 | 1/2008 | Flaherty et al. | |
| 2008/0000512 A1 * | 1/2008 | Flaherty et al. | 136/244 |
| 2008/0121270 A1 * | 5/2008 | Mayer et al. | 136/247 |
| 2008/0302031 A1 * | 12/2008 | Bressler et al. | 52/173.3 |
| 2009/0000222 A1 | 1/2009 | Kalkanoglu et al. | |
| 2011/0000535 A1 | 1/2011 | Davidson | |
| 2011/0017282 A1 | 1/2011 | Tas et al. | |
| 2011/0047894 A1 * | 3/2011 | Shadwell et al. | 52/105 |

FOREIGN PATENT DOCUMENTS

| | | |
|---|---|---|
| DE | 10 2010 019 815 A | 11/2011 |
| EP | 2 009 704 | 12/2008 |
| EP | 2 075 389 A2 | 7/2009 |
| GB | 2141157 A * 12/1984 | ............ E04D 1/30 |
| GB | 2 344 836 | 8/2002 |
| JP | H09-275644 A | 10/1997 |
| JP | 2005-191578 A | 7/2005 |
| KR | 20110128094 | 11/2011 |
| WO | WO 98/57009 | 12/1998 |
| WO | WO-2010/036980 | 4/2010 |
| WO | WO-2010/150316 | 12/2010 |

OTHER PUBLICATIONS

International Search Report regarding PCT/NZ2012/000222, dated Apr. 2, 2013, 7 pages.
Extended European Search Report and Written Opinion regarding European Patent Application No. 12852960.9, dated May 27, 2015, 6 pages.

* cited by examiner

ROOFING, CLADDING OR SIDING PRODUCT, ITS MANUFACTURE AND ITS USE AS PART OF A SOLAR ENERGY RECOVERY SYSTEM

CROSS-REFERENCE TO RELATED APPLICATIONS

This application claims the benefit of priority to international patent application number PCT/NZ2012/000221, having a filing date of Nov. 30, 2012, which claims the benefit of priority to New Zealand patent application number NZ 596793, having a filing date of Nov. 30, 2011, the complete disclosures of which are hereby incorporated by reference for all purposes.

TECHNICAL FIELD

The present technology relates generally to the manufacture of roofing, cladding and/or siding products, and to systems, assemblies, methods and uses for such a product, including the collection of solar and/or thermal energy.

BACKGROUND

The following description is provided to assist the understanding of the reader. None of the information provided or references cited is admitted to be prior art to the present invention.

Environmental and sustainability concerns have created a need for alternative or renewable energy systems. Solar energy is one type of renewable energy source, and the sun's energy can be collected in a variety of different ways. One is converting solar energy into thermal energy to heat a fluid, such as air or water. Another is converting solar energy to electricity using photovoltaic cells. A properly sized and installed solar energy collection system can be a practical alternative for acquiring energy needs.

The disadvantages of traditional products for these purposes are that they are heavy and difficult to install, many do not have good durability and environmental resistance, and many are difficult to mass produce economically. Such roofing and cladding surfaces tend to heat up over periods of exposure to sunlight, and the heat may then be transferred to the interior of the building. This can increase the expense of air conditioning and environmental control. Therefore, various methods of deflecting the heat, for example by providing reflective surfaces, are also known.

In some cases, exposure to sunlight can be beneficial because of the possibility of being able to photovoltaically generate electrical power. Generally, the collection of any significant amount of solar energy requires a large area of photovoltaic surface be exposed to unobscured sunlight. It is well known in the art that building roof tops and exterior wall cladding provide vast areas of unoccupied space where it is convenient and effective to position such photovoltaic surfaces. A series of photovoltaic panels may be mounted on a roof to generate electrical energy. This energy can be used as generated (wholly or in part), be stored wholly or in part (e.g. to batteries) and/or be converted to AC and be fed wholly or in part into the grid. An advantage in improved aesthetics, less weight, less panel materials and less exposure to wind can be achieved when such PV panels are integrated into the building cladding products. This can also reduce the total material and installation costs associated with a solar electricity system.

However, PV roofing and cladding products can be complex and costly to produce, especially in 3D polymer form and in large scale production. They can also lack durability, aesthetics and weather resistance that would otherwise be desirable in a roofing product. In terms of durability, many conventional PV roofing and cladding products are inherently unstable when exposed to sunlight for an extended period of time. Moreover, prior art photovoltaic roofing shingles are generally difficult to install. These products typically come as single tiles or shingles. Numerous tiles or shingles are required in an array to provide roof cladding. Such small tiles or shingles require electrical junctions between each of the photovoltaic cells. Such junctions can be time consuming to connect and are often a failure point of the product because they corrode or the connections are incorrectly made. A further difficulty is that some of the energy from the solar cells will simply be dissipated as heat. The hotter the cells get, the less efficiently they work, and the higher the heat transmission through the roof surface into the building. Because roofing tiles are often designed to insulate the rest of the house from getting too hot, they also tend to prevent the solar cells from cooling effectively.

Therefore, a need exists for thermal and/or photovoltaic roofing systems that are easy to manufacture, effectively utilize the sun's energy, are weatherproof, durable, aesthetically pleasing, and economical.

It is therefore an object of the present invention to provide a for thermal and/or photovoltaic roofing product and/or system which will go at least some way towards addressing the foregoing problems or which will at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF INVENTION

In various aspects, the present invention provides a roofing, cladding or siding product which is light weight, easy to install, weatherproof, durable, resistant to environmental wear, and aesthetically pleasing. One embodiment relates to a module that can be used to form a weatherproof covering over top of a building surface. Another embodiment is a module which can, in additional to forming a weatherproof covering, be used as part of a thermal energy recovery or removal system. Yet another embodiment is a module which can, in addition to forming a weatherproof covering, and optionally in addition to being useful as part of a thermal energy recovery or removal system, bears an array of solar cells to generate electrical energy.

In a first aspect, the present invention provides a roofing, cladding, or siding module comprising a plurality of formed surfaces moulded from one or more polymeric materials, wherein each of the formed surfaces comprise three dimensional surface features, and wherein the formed surfaces are joined (i.e., integrated together, juxtaposed, or united) without weld lines or injection moulding points.

In one embodiment, each formed surface is a moulded segment along the length of the module. In one embodiment, the three dimensional surface features of each of the formed surfaces are the same or different. In one embodiment, the three dimensional surface features have the same or variable thickness. In one embodiment, the module is substantially flat. In one embodiment, each formed surface comprises an underlapping region and an exposed region, wherein the underlapping region is adapted to be substantially covered by the exposed region of an adjacent module when installed on a building surface.

In one embodiment, the roofing, cladding, or siding module comprises a plurality of formed surfaces moulded from one or more polymeric materials, wherein each of the formed surfaces comprise three dimensional surface features, and wherein the formed surfaces are sequentially formed in a continuum. In some embodiments, the module is formed as it runs through a continuous forming process (as opposed to a die stamping or injection moulding process). Thus, the formed surfaces with the three dimensional surface features are sequentially formed in the continuous forming process.

In a second aspect, the present invention provides a roofing, cladding, or siding module comprising: an underlapping region and an exposed region, wherein the underlapping region is adapted to be substantially covered by the exposed region of an adjacent module when installed on a building surface; and an outer surface and an under surface, wherein the under surface of the underlapping region is profiled to define a pathway for air flow between the module and the building surface.

In one embodiment, the outer surface of the exposed region comprises surface ornamentation. In one embodiment, the surface ornamentation resembles asphalt shingles, slate, wooden shakes, concrete tiles, or the like.

In one embodiment, the outer surface of the exposed region comprises a photovoltaic cell or device. In one embodiment, the module further comprises a solar radiation transmissible film which is overlaid upon the photovoltaic cell.

In one embodiment, the profile of the underside of the underlapping surface is patterned in a manner to (1) create turbulence in the airflow, (2) increase the surface area of the module in contact with the passing airflow compared to a module lacking such a surface pattern, or both (1) and (2). In one embodiment, the profile of the underside of the underlapping region comprises a plurality of projections that create a tortuous pathway above the actual or notional plane of the building surface. In one embodiment, the profile of the underside of the underlapping region comprises corrugated form of alternating parallel grooves and ridges.

In one embodiment, the module is moulded from one or more polymeric materials. In one embodiment, the one or more polymeric materials are selected from the group consisting of polycarbonate, foamed polycarbonate, thermoplastic polyurethane (TPU), thermoplastic polyolefin (TPO), polyvinyl chloride (PVC), aquilobutalstyrene (ABS), styrene-acrylonitrile resin (SAN), thermoplastic rubber, and any other amorphous or crystalline polymer or combination of polymers. In one embodiment, the one or more polymeric materials are flame retardant. In one embodiment, the one or more polymeric materials are weather, hail, ultraviolet, tear, mold and impact resistant.

In one embodiment, the module comprises at least two layers of polymeric material, wherein the layers are of the same or different polymeric material. In one embodiment, at least one material has high UV resistance. In one embodiment, at least one material has high thermal conductivity. In one embodiment, the module further comprises a reinforcement layer.

In one embodiment, the module or the polymer layers can be coloured or comprise a blend of colours. In one embodiment, the polymer on the outer layer of the module can be manufactured to mimic traditional roofing products. In one embodiment, the polymer on the outer layer of the module can be coloured to contrast with the colour of the PV cell layer to define an aesthetic feature, e.g. shadows.

In one embodiment, the module comprises a first and a second polymeric material. In one embodiment, the first polymeric material has been foamed. In one embodiment, the first polymeric material is able to chemically bond with the second polymeric material. In one embodiment, the first polymeric material, the second polymeric material, or both further comprise thermally conductive inclusions. In one embodiment, the thermally conductive inclusions have been blended and/or bonded to a compatible polymer or ionomer prior to mixing with the first polymeric material. In one embodiment, the thermally conductive inclusions are aluminum particles. In one embodiment, the second polymeric material can self seal to a penetrative fastener. In one embodiment, the first material is foamed polycarbonate and the second material is thermoplastic polyurethane.

In one embodiment, the top and bottom sides of the underlapping region contain complementary locating elements. In one embodiment, the underlapping region is profiled to define one or more regions for fixing by a penetrative fastener. In one embodiment, the one or more regions for fixing by a penetrative fastener are adapted to receive a nail or screw gun head to accurately locate the fixing.

In one embodiment, the module has a convex precamber configured to apply a pre-load pressure to encourage the edges and bottom surface to contact firmly onto an adjacent underlapping panel when installed on a building. In one embodiment, the upper surface of the underlapping region, the lower surface of the exposed region, or both, comprise a strip of flexible polymeric material configured to prevent water from penetrating between two overlapping modules.

In one embodiment, the module has one or more concertina-shaped features to accommodate thermal expansion and contraction between fixing points.

In one embodiment, the upper surface of the underlapping region comprises channels configured to receive wires of a photovoltaic array. In one embodiment, the upper surface of the underlapping region comprises markings to show the correct position of wires and junctions for a photovoltaic array. In one embodiment, the upper surface of the underlapping region comprises pockets or channels configured to receive printed circuit boards (PCB), communication devices, junction boxes, wires, buses, components, cells, and/or diodes of a photovoltaic array.

In one embodiment, the module is manufactured by a continuous forming process. In one embodiment, the module is continuously formed into a horizontal strip capable of extending substantially across an entire section or width of the building surface to be covered. In one embodiment, the module is continuously formed into a vertical strip capable of extending substantially down an entire section or length of the building surface to be covered.

In a third aspect, the present invention provides a roofing, cladding, or siding assembly comprising a plurality of partially-overlapping modules that substantially covers a building surface, wherein each module comprises an underlapping region and an exposed region, wherein the underlapping region is adapted to be substantially covered by the exposed region of an adjacent module when installed on a building surface and the exposed region is adapted to be substantially exposed when installed on a building surface; an outer surface and an under surface, wherein the under surface of the underlapping region is profiled to define a pathway for air flow between the module and the building surface.

In one embodiment, one or more of the modules comprises a photovoltaic cell or device. In one embodiment, the photovoltaic cell or devices are electrically connected by continuous bus strips. In one embodiment, the continuous bus strips only require one terminating junction point to be connected on installation. In one embodiment, the air flow between the underlapping region and the building surface is induced by convection or a fan.

In one embodiment, the modules overlap down the fall of the building surface. In one embodiment, the modules overlap across a building surface. In one embodiment, each module is adapted to be fixably attached to the building surface by at least one fastening member or adhesive. In one embodiment, at least one fastening member is a nail, staple or screw. In one embodiment, the roofing, cladding, or siding assembly forms a weathertight seal over the building surface.

In a fourth aspect, the present invention provides a system for removing or recovering thermal energy from a building surface, the system comprising a building surface; a roofing, cladding, or siding assembly comprising a plurality of partially-overlapping modules that substantially covers the building surface, wherein each module comprises an underlapping region and an exposed region, wherein the underlapping region is adapted to be substantially covered by the exposed region of an adjacent module when installed on a building surface and the exposed region is adapted to be substantially exposed when installed on a building surface; an outer surface and an under surface, wherein the under surface of the underlapping region is profiled to define a pathway for air flow between the module and the building surface; and a fan adapted to induce the air flow.

In one embodiment, the system further comprises a heat exchanger. In one embodiment, the heat exchanger is part of an air conditioning system, water heating system, or air or media (e.g., sand, ground glass, or concrete) heating system.

In a fifth aspect, the present invention provides a system for generating electricity and recovering or removing thermal energy from a building surface, the system comprising a building surface; a roofing, cladding, or siding assembly comprising a plurality of partially-overlapping modules that substantially covers the building surface, wherein each module comprises an underlapping region and an exposed region, wherein the underlapping region is adapted to be substantially covered by the exposed region of an adjacent module when installed on a building surface; and an outer surface and an under surface, wherein the under surface of the underlapping region is profiled to define a pathway for air flow between the module and the building surface, and wherein the outer surface of the exposed region comprises one or more photovoltaic cells.

In one embodiment, the system further comprises a vent for exhausting the air flow. In one embodiment, the system further comprises a heat exchanger adapted to receive the air flow. In one embodiment, the air flow is induced by a fan. In one embodiment, the speed of the fan is proportional to the energy created by one or more PV cells. In one embodiment, the air flow is reversible in order to heat the roof to remove snow, ice, and/or moisture. In another embodiment, the air flow is able to move air from a warmer section of the roof to a cooler section of the roof. In one embodiment, the system is operable (a) to generate electricity from the one or more photovoltaic cells and (b) to duct an induced or uninduced air flow to be heated and outputted to the heat exchanger during times of solar absorption or heat transmission by the modules.

In a sixth aspect, the present invention provides a method for removing or recovering thermal energy from a building surface, the method comprising inducing an airflow to pass through an air passage between a building surface and an under surface of a plurality of partially-overlapping modules that substantially cover the building surface; wherein each module comprises an underlapping region and an exposed region, wherein the underlapping region is adapted to be substantially covered by the exposed region of an adjacent module when installed on a building surface and the exposed region is adapted to be substantially exposed when installed on a building surface; and an outer surface and an under surface, wherein the under surface of the underlapping region is profiled to define a pathway for air flow between the module and the building surface.

In one embodiment, the method further comprises venting the airflow to the outside of the building. In one embodiment, the method further comprises collecting the thermal energy from the airflow after it passes through the air passage. In one embodiment, the collecting of thermal energy is by placing the airflow in thermal contact with a cooler fluid. In one embodiment, the cooler fluid comprises part of an air conditioning or water heating system.

In a seventh aspect, the present invention provides a method for simultaneously generating electricity and recovering thermal energy from a building surface, the method comprising inducing an airflow to pass through an air passage between a building surface and an under surface of a plurality of partially-overlapping modules that substantially cover the building surface; and collecting electrical energy from one or more photovoltaic cells present on an exposed surface of the modules; wherein each module comprises an underlapping region and an exposed region, wherein the underlapping region is adapted to be substantially covered by the exposed region of an adjacent module when installed on a building surface and the exposed region is adapted to be substantially exposed when installed on a building surface; and an outer surface and an under surface, wherein the under surface of the underlapping region is profiled to define a pathway for air flow between the module and the building surface.

In an eighth aspect, the present invention provides a method of manufacture of a roofing, cladding, or siding module, the method comprising: providing to a continuous forming machine a feed material able to assume and retain a form after being moulded between a first forming surface and a second forming surface; allowing the formation to take place as such surfaces are advanced in the same direction; wherein the output is a roofing, cladding, or siding module comprising: an underlapping region and an exposed region, wherein the underlapping region is adapted to be substantially covered by the exposed region of an adjacent module when installed on a building surface; and an outer surface and an under surface, wherein the under surface of the underlapping region is profiled to define a pathway for air flow between the module and the building surface.

In one embodiment, the feed material comprises a layer of a first material beneath a layer of a second material. In one embodiment, the first material is extruded to a supporting surface of a continuous forming machine, and the second material is extruded to the top surface of the feed of first material. In one embodiment, the exposed region comprises both materials, and the underlapping region comprises, at least in part, only one of the materials. In one embodiment, the axis of advancement of the materials in the continuous forming machine is commensurate with the longitudinal axis of the module as it lies with the longitudinal axis across the fall of a roof to be clad thereby.

In one embodiment the entire roofing, cladding or siding module is made from a single material.

In one embodiment the module design features can be achieved by thermoforming, pressing, or other method of forming, either continuously or discontinuously wood, metal, concrete, resins, glass, clay, composites or the like.

In a ninth aspect, the present invention provides a method of manufacture of a roofing, cladding or siding module, the method comprising: providing a feed material in liquid or viscous form to a mould in a moulding position; allowing the material to be moulded as a segment in the moulding position; advancing the moulded segment to a position subsequent to, yet partially overlapping the moulding position; providing further material in liquid or viscous form to the moulding position; allowing the material to be moulded as a further segment in the moulding position along with, or so as to adhere to, the overlapping section of the previously moulded segment; wherein the output is a roofing, cladding, or siding module comprising: an underlapping region and an exposed region, wherein the underlapping region is adapted to be substantially covered by the exposed region of an adjacent module when installed on a building surface; and an outer surface and an under surface, wherein the under surface of the underlapping region is profiled to define a pathway for air flow between the module and the building surface.

In a further aspect, the invention provides a roofing, cladding, or siding module having (i) a region to underlap a like or other module and (ii) a region to overlap a like or other module; wherein the overlap region has on, or at least towards, its upper surface serially formed zones of three dimensional features, such zones being of polymeric material(s) provided as a continuum for that module's zones.

In some embodiments, the polymeric material is a layer over at least one underlying layer of polymeric material(s). One or other of the polymeric materials may include a thermally conductive inclusion. In one embodiment, each such zone of three dimensional features of an overlap region and a corresponding part of an underlap region is formed simultaneously. In one embodiment, the same polymeric material(s) provides each said zone and at least part of the underlap region.

In one embodiment, each region to underlap and each region to overlap are three dimensionally contoured. Such contouring can be through to the under surface to provide for compatibility in overlap indexing. In one embodiment, the overlap region on its upper surface is both dimensionally contoured for aesthetic purposes and provided with zones of features for solar related functionality purposes, e.g. features for association with photovoltaics. In one embodiment, such zones of three dimensional features are mutually juxtaposed or at least mutually close.

In a further aspect, the invention provides a building integrated solar energy recovery system, the system comprising, including or using a roofing, cladding or siding of modules or the equivalent ("modules") partially overlapping their adjacent modules down and/or across a building surface yet to collect in sunlight either, or both, (a) heat solar energy as heat at least in part to pass to an underlying air flow, and/or (b) to generate electricity photovoltaically for outputting and consequential heat at least in part to pass to said underlying air flow. In one embodiment, the modules, as installed on the building surface, with profile features of each module, provide an underlying pathway for an airflow to be heated by solar energy absorption and/or transmission through said modules. In one embodiment, as part of the cladding array, photovoltaic devices or functionality included and/or carried by a region or regions of any one or more module are not overlapped by an adjacent module.

In a further aspect, the invention provides the use of a building integrated solar energy recovery system to either or simultaneously: (a) generate electricity from the photovoltaic array of shingles with a photovoltaic functionality; and/or (b) duct heated air (e.g. for heat transfer purposes) from an induced or uninduced air flow under one or more roofing, cladding or siding modules during times of solar absorption and/or heat transmission by the modules.

In a further aspect, the invention provides a roofing, cladding or siding component suitable or installed to pass solar energy received by at least some of its regions into an underlying airstream, and with a photovoltaic regional functionality with a photovoltaic receiving region to convert received solar energy into an electrical output. In one embodiment, when as part or as part of a series down or across an underlying building surface, is useable whereby each photovoltaic receiving region is fully exposed despite partial overlapping of one component to another to better shed water; and is useable whereby, despite attachment to the underlying building surface, there is a setout from the underlying building surface sufficient to allow a passage of an underlying airstream.

In some embodiments, at least part of the profile of each roofing component has been moulded (i) by a CFT (as herein defined); and/or (ii) to accommodate a photovoltaic functionality; and/or (iii) to accommodate interconnection functionalities of photovoltaic areas; and/or to define at least in part said configuration; and/or (iv) to be very much greater in dimension across the building surface to be covered than the dimension it will cover down said building surface; or (v) to be very much greater in dimension down the building surface to be covered than the dimension it will cover across said building surface.

In some embodiments, the dimension of the module in the direction that extends across the building surface is at least 3 times, or at least 4 times, or at least 5 times, or at least 10 times, or at least 15 times, or at least 20 times that of the dimension of the module that extends down the building surface. In some embodiments, the dimension of the module in the direction that extends down the building surface is at least 3 times, or at least 4 times, or at least 5 times, or at least 10 times, or at least 15 times, or at least 20 times that of the dimension of the module that extends across the building surface.

In a further aspect, the invention provides a roofing, cladding or siding module or equivalent ("module") comprising or including a moulding of a first material and a second material; wherein the first material defines a first region or first regions ("first region(s)") and a second or second regions ("second region(s)"), whether profiled or not; and wherein the second material defines an overlay or underlay of at least part of one of said first and second regions; and wherein a plurality of said modules lapping their neighbour down or across a building surface with a notional or actual planar surface to be overclad by such a series of modules to form a weathertight seal over said building surface.

In a further aspect, the invention provides a roofing, cladding or siding assembly comprising or including a structure to provide a support surface, and a plurality of modules to cover the underlying support surface, the modules relating to any neighbour(s) in an overlapping arrangement down the fall or pitch of the underlying surface, thereby to define the exterior fall or pitch of the roofing, cladding or siding assembly; wherein at least some of the modules include photovoltaic ("PV") devices exposed to sunlight able to generate an electrical output; and wherein the plurality of modules define a pathway above the support surface for an air flow, induced or otherwise, to be heated by heat exchange from at least some of the modules as a consequence of heating of the modules by received sunlight or heating of the modules as a consequence of the effect of received sunlight on the PV devices, or both.

In a further aspect, the invention provides the use of a roofing, cladding or siding assembly as herein described to either or simultaneously: (a) to generate electrical output from said PV devices; and/or (b) heat an induced or other air flow by heat exchange from at least some of the modules as a consequence of heating of the modules by received sunlight or heating of the modules as a consequence of the effect of received sunlight on the PV devices, or both.

In a further aspect the invention is a method of manufacture of a roofing, cladding or siding component, or substrate therefor, which comprises or includes the steps of: providing to at least one of the forming surfaces of a continuous or discontinuous forming machine a feed of material able to assume and retain a form after being moulded between that first mentioned forming surface and a second forming surface, and allowing that formation to take place as such surfaces are advanced in the same direction; wherein the output is of a form having a profiled region to step out part of that region from an underlying actual or notional planar surface, yet providing another region to, at least in part, overlap said profiled region of a like form.

In a further aspect, the invention provides a method of manufacture of a roofing, cladding or siding component, or substrate therefor, which comprises or includes the steps of: providing material in liquid or viscous form to mould in a moulding position; allowing said material to be moulded as a segment in said moulding position; advancing said moulded segment to a position subsequent to, yet partially overlapping said moulding position; providing further material in liquid or viscous form to the moulding position; allowing said material to be moulded as a further segment in the moulding position along with, or so as to adhere to, the overlapping section of the previously moulded segment; wherein the output is of a form having a profiled region to step out part of that region from an underlying actual or notional planar surface, yet providing another region to, at least in part, overlap said profiled region of a like form.

In a further aspect, the invention provides a method of manufacture of a roofing, cladding or siding component, or substrate therefor, which comprises or includes the steps of: (1) extruding or otherwise providing a feed of a first material to a supporting surface of a continuous forming machine, the feed having a width WI and thickness TI; (2) extruding or otherwise providing a feed of a second material to the top surface of the feed of first material, the feed having a width WII and thickness TII; (3) allowing the two materials to be formed; and wherein the output is of a form having a first profiled region to step out part of that region from an underlying actual or notional planar surface, yet providing a second region to, at least in part, overlap said profiled region of a like form; and wherein said second region is covered by both materials, and said profiled region is covered, at least in part, by only one of the materials. In one embodiment, the axis of advancement of the materials in the continuous forming machine is commensurate with the longitudinal axis of a roofing shingle that is to lie with said longitudinal axis across the fall of a roof to be clad thereby.

In a further aspect, the invention provides a roofing, cladding or siding component, or substrate of a roofing, cladding or siding component including product having a first region and a second region, the component to be used as a covering across the fall of a building structure and to overlap at least in part with its first region, and to underlap at least in part with its second region, the first and second regions of a like component or substrate; wherein the component has been formed by a feed of materials into a continuous forming machine to profile at least one or either, or both, of the first and second regions or at least parts thereof; and wherein the advance direction of the continuous forming machine defines the elongate axis of the component that is to lie across the fall of the building surface.

In another aspect, the invention provides a roofing, cladding or siding module adapted to be fixed with its elongate axis across the fall of the building surface to be clad; the module having a first longitudinal region to underlie, in use, a like module or flashing, and a second longitudinal region, in use, to overlie a like module or to simply be exposed; wherein the first and second regions share in common a first material; and wherein the first and second regions share in common a second material, yet the second region has its upper surface defined by a second material while only part of the first region (i.e. that part of the first region proximate to the second region) has its upper surface defined by said second material; and wherein there has been such sharing of the first and second materials since a continuous forming process; and wherein one, some or all of the following apply: (i) at least the underside of the first region defines a profile of projections (eg mesa-like or otherwise) to stand the remainder of the first region off from an actual support or notional support plane; (ii) such projections define a tortuous pathway above the actual or notional plane; (iii) the topside of the first region, with depressions, provide a female version of the male underside; (iv) the second material is weather resistant; (v) the first material has been foamed; (vi) the first material includes particulate thermally conductive inclusion; (vii) the second material can self seal to a penetrative fastener; (viii) the first material is a polymeric material, the second material is a polymeric material, at least the upper surface of the second region has been profiled; (ix) the upper surface of the second region has been profiled to simulate conventional roofing products (e.g. tiles, slate, shingles shakes or the like); (x) the upper surface of the second region channels, pockets or the like to accommodate or accommodating the buses and/or cells of a photovoltaic array; (xi) the first and second materials have been coextruded or serially extruded into a continuous forming machine; and (xii) the extrusion has been into an advancing continuous forming machine where the elongate axis is aligned to the advancement.

In a further aspect, the invention provides a method of recovering thermal energy from a building surface, said method comprising the steps of covering the surface with a plurality of lapping modules such that said modules are stood off from said surface to allow an air passage, inducing an airflow to pass through said air passage and collecting the thermal energy from the airflow subsequent to its passing through the air passage, wherein said modules are of a form having a first profiled region to step out part of that region from an underlying actual or notional planar surface, yet providing a second region to, at least in part, overlap said profiled region of a like form; and wherein said profiled region includes a plurality of projections, such projections to define a tortuous pathway above the actual or notional plane.

In a further aspect, the invention provides a roofing shingle, tile or equivalent module ("shingle") substantially as herein described, with or without reference to the accompanying drawings.

In a further aspect, the invention provides a roof assembly substantially as herein described, with or without reference to the accompanying drawings.

In a further aspect, the invention provides a building integrated solar energy recovery system substantially as herein described, with or without reference to the accompanying drawings.

In a further aspect, the invention provides a roof clad by roofing components of any aspect of the present invention.

In a further aspect, the invention provides a building surface clad by cladding or siding components of any aspect of the present invention.

The foregoing summary is illustrative only and is not intended to be in any way limiting. In addition to the illustrative aspects, embodiments, and features described above, further aspects, embodiments, and features will become apparent by reference to the following drawings and the detailed description.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

DETAILED DESCRIPTION

Figure 1:
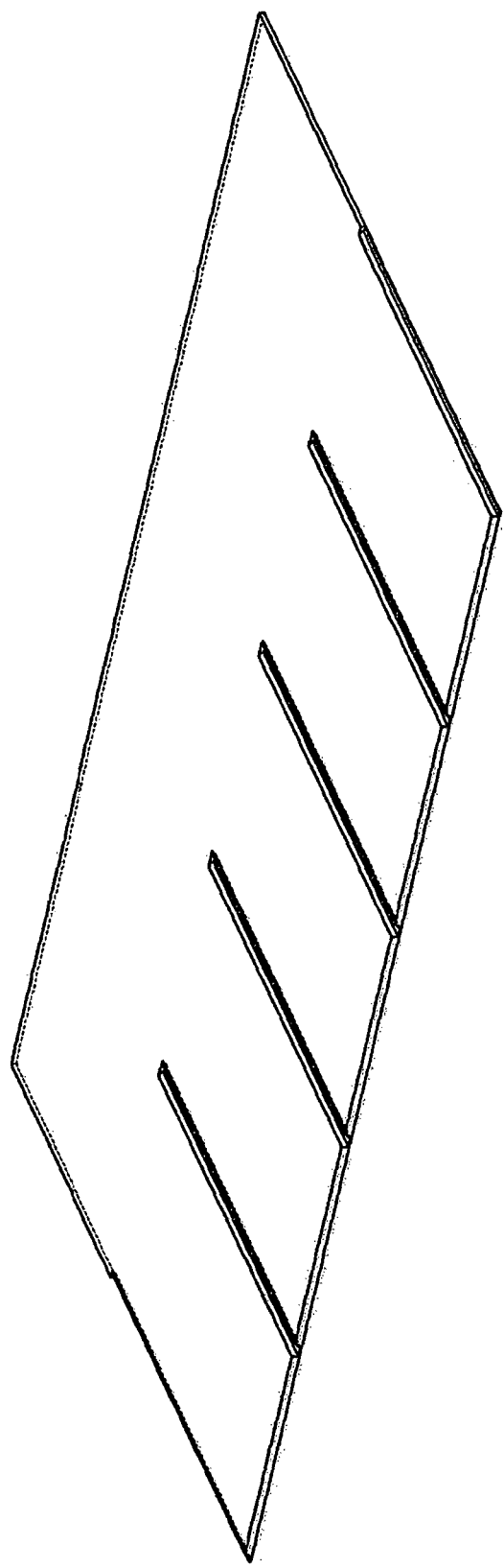
FIG. 1 shows an illustrative embodiment of a continuously formed roofing, cladding or siding module in its basic form.

It is to be appreciated that certain aspects, modes, embodiments, variations and features of the invention are described below in various levels of detail in order to provide a substantial understanding of the present technology.

The present technology is described herein using several definitions, as set forth throughout the specification. Unless otherwise stated, the singular forms "a," "an," and "the" include the plural reference. For example, a reference to "a device" includes a plurality of devices.

As used herein the term "and/or" means "and" or "or", or both.

As used herein "(s)" following a noun means the plural and/or singular forms of the noun.

Relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

As used herein, the term "formed surface" refers to a moulded segment of a polymeric material corresponding to an individual die or mold of a continuous forming machine.

As used herein, the term "building surface" refers to a wall surface or a top surface, etc. of a building, e.g. an exterior wall, a roof, a ceiling, etc., unless otherwise specified. In the context of a roof, the building surface typically comprises a waterproof roofing membrane attached to the roof deck adjacent an eave of the roof for preventing water damage to the roof deck and an interior of a building from wind-blown rain or water buildup on the roof. The roof deck is typically made of an underlying material, such as plywood. The waterproof membrane may be any of a number of waterproof roofing membranes known in the art such as but not limited to bituminous waterproof membranes, modified bituminous roofing membranes, self-adhering roofing membranes, or single ply waterproofing roofing membranes (e.g. EPDM waterproof roofing membranes, PVC waterproof roofing membranes, TPO waterproof roofing membranes). One exemplary membrane sheet is Deck-Armor™ Roof Protection, manufactured by GAF Corp., Wayne, N.J.

As used herein, the term "roofing" means the provision of a protective covering on the roof surface of a building. Without limitation, such a protective covering might take the form of shingles, tiles, panels, shakes, planks, boards, modules, mouldings or sheets.

As used herein, the terms "cladding" and/or "siding" mean the provision of a protective covering on a side or other surface of a building. Without limitation, such a protective covering might take the form of shingles, tiles, panels, shakes, planks, boards, modules, mouldings or sheets.

As used herein, the terms "profiled" and/or "contoured" mean having a region, or regions which extend above or below a notional planar surface lying along the longitudinal axis of the product. This includes profiling or contouring of only one upper or lower surface, and/or profiling or contouring of an entire thickness of material such that the upper and lower surfaces have the same relative degree of extension above or below the notional planar surface.

As used herein, the term "thermally conductive particles" or "thermally conductive inclusions" refers to particles or inclusions of any conductive material. These include, but are not limited to, particles of the following materials: metals, metal hybrids, carbon, silica, glass, conductive polymers, salts, carbon nanotubes and compounds of these substances. In addition to assisting in heat transfer, the thermally conductive particles or inclusions may also act as a reinforcing material.

As used herein, the term "polymer" (and associated terms such as "polymeric") includes polymers, polymer blends, and polymers with or without additive inclusions.

The present technology relates to a cladding or roofing product. In some embodiments, the product comprises modules having g a plurality of formed surfaces moulded from one or more polymeric materials (which may be in layers), wherein each of the formed surfaces comprises three dimensional surface features. The present technology also relates to a product having good thermal conductivity and a capacity for photovoltaic ("PV") and/or solar thermal energy generation, and related subassemblies, assemblies, uses and methods. The present technology has several advantages. For example, the roofing, cladding or siding product may reduce the amount of heat energy transferred to the interior of the building upon which it is mounted; and/or to provide a system which incorporates a roofing, cladding or siding product to that effect; and/or to provide a method by which mass production of such a product could be achieved; or at least provides the public with a useful choice.

In other embodiments, the present invention provides a Building Integrated Photovoltaic ("BIPV") and/or solar thermal roofing, cladding or siding product which is reasonably light weight, easy to install, durable and resistant to environmental wear; or at least provides the public with a useful choice.

In other embodiments, the present invention provides a BIPV and/or solar thermal roofing, cladding or siding product that does not require a fastener (nail, screw, bolt, etc.) to penetrate the exposed surfaces of the roof, thereby making the product less likely to leak compared to convention BIPV products; or at least provides the public with a useful choice.

In other embodiments, the present invention provides a BIPV and/or solar thermal roofing, cladding or siding product capable of large surface area coverage, that can be mass produced in high volumes and with reasonable speed of production; and/or to provide a method by which such mass production of such a product could be achieved; or at least provides the public with a useful choice.

In other embodiments, the present invention provides a BIPV and/or solar thermal roofing, cladding or siding product which will allow heat energy to be transferred away from the photovoltaic cell to maximise its operational efficiency; and/or to provide a system which incorporates a BIPV roofing, cladding or siding product to that effect; and/or to provide a method by which mass production of such a product could be achieved; or at least provides the public with a useful choice.

Figure 23:
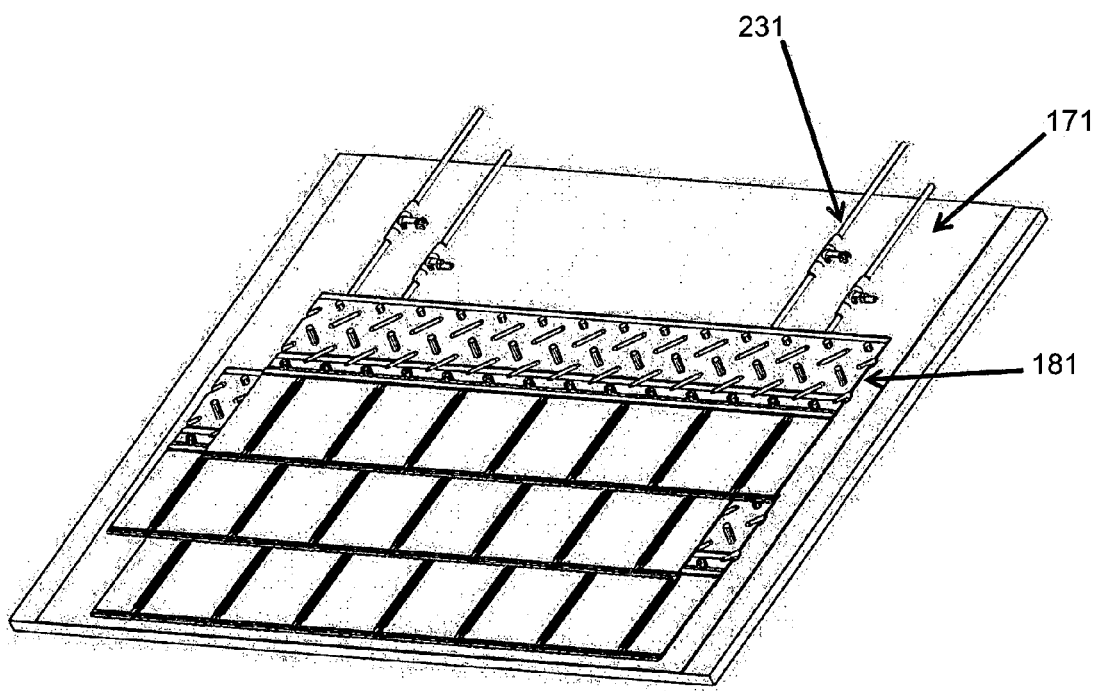
FIG. 23 shows an overlapping series of one embodiment of the module designed to carry a solar array for photovoltaic power generation.

In other embodiments, the present invention provides an airway path to allow space for wires and other electrical components to run between the roof and the building structure with such wires and electrical components located above a waterproof membrane on the building substrate surface therefore ensuring that the waterproof membrane is not penetrated (as seen in FIG. 23).

In yet other embodiments, the present invention provides a building integrated system which allows solar, ambient and photovoltaically generated heat to be transferred away from a building surface and used elsewhere; and/or the components of such a system; and/or a method of manufacturing such components; or at least provides the public with a useful choice.

Various embodiments of the present invention relate to a roofing, cladding or siding product to be secured to a building in a lapping arrangement. In one embodiment the product is formed as a module to be laid horizontally across a surface and lapped vertically down that surface, however, it is also possible to manufacture the product so as to allow it to be laid in vertical columns which would then lap across the surface. In particular, three illustrative embodiments of the product are described below. The first is a module which can be used to form a weatherproof covering over top of a building surface; the second is a module which can, in additional to forming a weatherproof covering, be used as part of a thermal energy recovery system; and the third is a module which can, in addition to forming a weatherproof covering, and optionally in addition to being useful as part of a thermal energy recovery system, bears an array of solar cells to generate electrical energy.

In the following description the general features of the product and their functional advantages are described. It should be appreciated that all of the various features may or may not be present depending on which embodiment of the module is required. Furthermore, there may be various combinations of the features and combinations of the embodiments, which although not specifically referred to, are intended to be covered by this specification.

In one aspect, the present invention provides a roofing, cladding or siding product which is reasonably light weight, easy to install, durable and resistant to environmental wear. In some embodiments, the roofing, cladding or siding product is capable of large surface area coverage, can be mass produced in high volumes and with reasonable speed of production; and/or provides a method by which such mass production of such a product can be achieved.

In one embodiment, the roofing, cladding or siding product is a module comprising a plurality of formed surfaces moulded from one or more polymeric materials (which may be in layers), wherein each of the formed surfaces comprises three dimensional surface features, and wherein the formed surfaces are joined without weld lines or injection moulding points. Each formed surface refers to a moulded segment along the length of the module that corresponds to an individual dye or mold of a continuous forming machine. See PCT/NZ2006/000300 (published as WO2007/058548). Use of the term "joined" in this context is not intended to require that each of the formed surfaces were ever separated, i.e., the formed surfaces may be integrally formed together in situ during the manufacturing process. In another embodiment, the module design features can be achieved by thermoforming, pressing, or other method of forming, either continuously or discontinuously wood, metal, concrete, resins, glass, clay, composites or the like.

In particular, the product can be manufactured in long strips (as seen in FIG. 1) by a continuous process which incorporates a continuous forming step, and therefore can be made in varying lengths as required depending on the required coverage area. Production is such that a single moulded module, capable of extending across the entire width or section of the roof or building to be protected, can be manufactured. For example, the modules may be very much greater in dimension across the building surface to be covered than the dimension it will cover down the building surface. In one embodiment, the dimension of the module in the direction that extends across the building surface is at least 3 times, or at least 4 times, or at least 5 times, or at least 10 times, or at least 15 times, or at least 20 times that of the dimension of the module that extends down the building surface. Alternatively, the modules may be very much greater in dimension down the building surface to be covered than the dimension it will cover across the building surface. In one embodiment, the dimension of the module in the direction that extends down the building surface is at least 3 times, or at least 4 times, or at least 5 times, or at least 10 times, or at least 15 times, or at least 20 times that of the dimension of the module that extends across the building surface.

Figure 2:
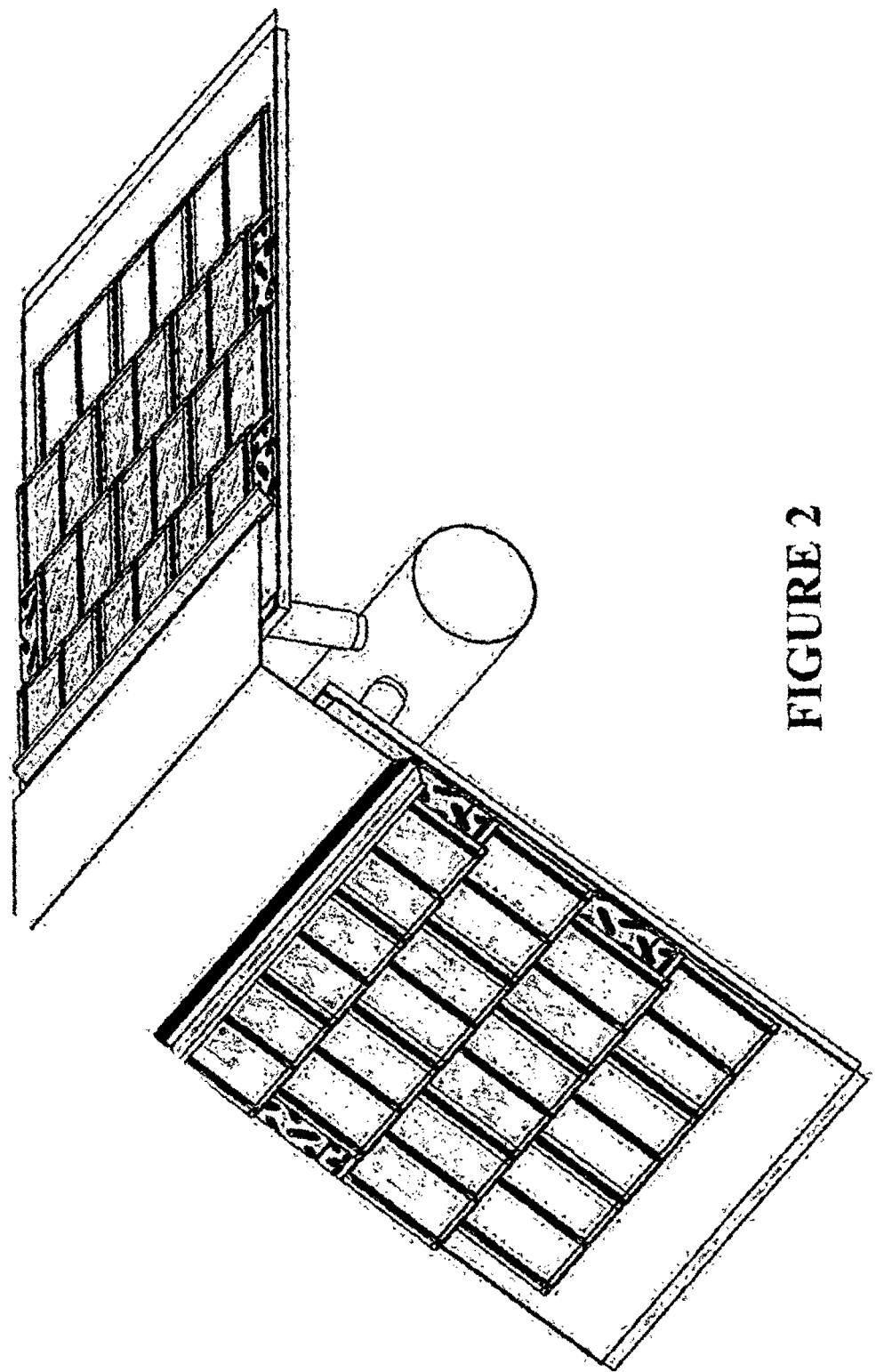
FIG. 2 shows an illustrative embodiment of a continuously formed roofing, cladding or siding module fixed in an overlapping arrangement upon a building surface.

In some embodiments, the modules are about 0.2-1 in length, 1-20 meters in length, about 3-10 meters in length, or about 4-8 meters in length, or 2-4 meters in length. Modules of 4-5 meters in length, and modules of 8 meters in length are suitable manufacturing sizes, but the manufacturing process allows custom lengths to be accommodated just as easily. A plurality of such modules can then be arranged in lapping rows down the surface of the structure, for example, as shown by the lapping roof shingles seen in FIG. 2.

Figure 3:
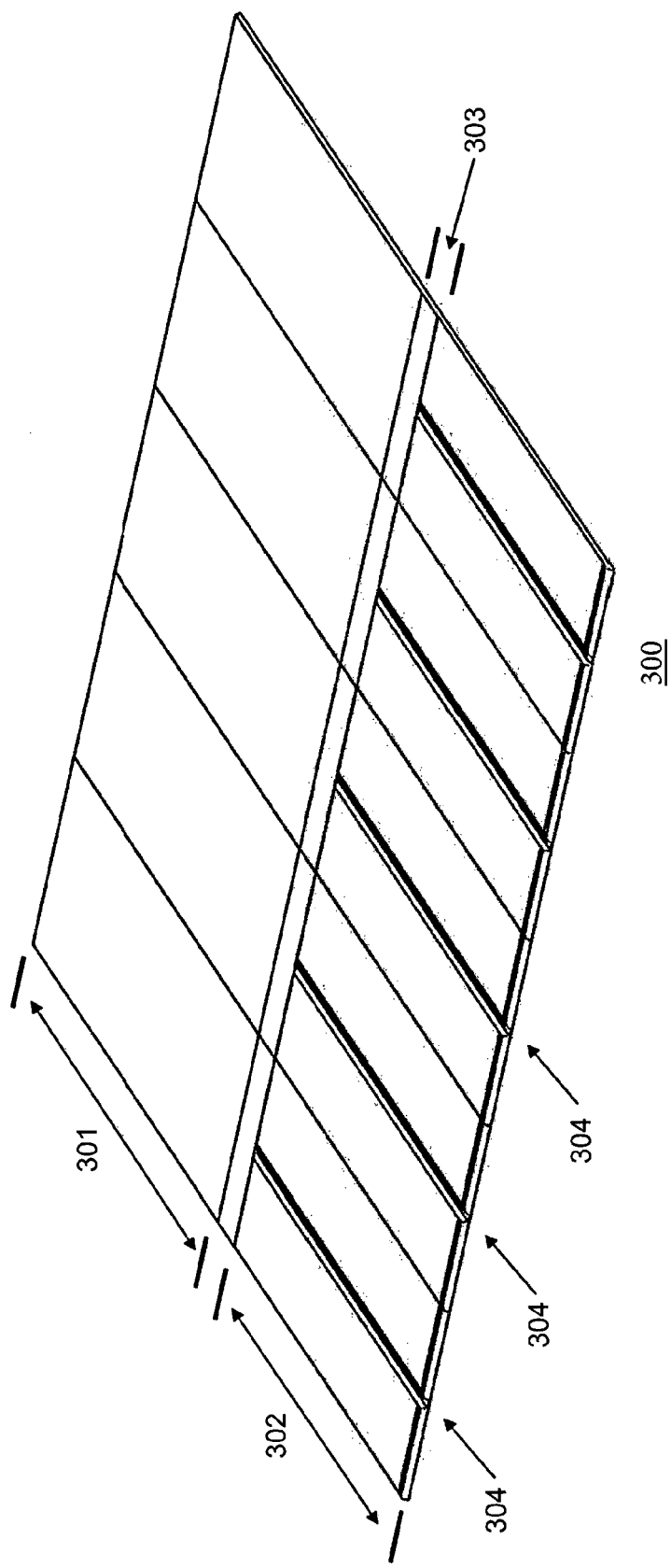
FIG. 3 shows the underlapping, exposed and fixing regions of an illustrative embodiment of the roofing module.

The features of an illustrative embodiment of the basic roofing product are as shown in FIG. 3. There is an underlapping region 301, and an exposed region 302 (i.e. to be exposed when a series of modules are positioned in a lapping arrangement). There may also be a fixing region 303 where the module 300 is to be attached to the building surface, and this may or may not be within the underlapping region 301, but is suitably or optionally within the underlapping region 301. The regions may exist in various proportions comparative to each other, and there may be profiling or contouring 304 of any or all regions in a continuous or discontinuous pattern along the length of the module 300. In one embodiment, the width of the underlapping region 301 approximately equals the width of the overlapping region 302. In other embodiments, the width of the underlapping region 301 is about 95%, about 90%, about 80%, about 75%, about 60%, about 50%, about 40%, about 30%, about 25%, about 15%, or about 10% of the width of the overlapping region 302. In some embodiments, the overlapping region 302 is from about 5 cm to about 60 cm wide and the underlapping region 301 is from about 5 cm to about 60 cm wide.

Figure 4:
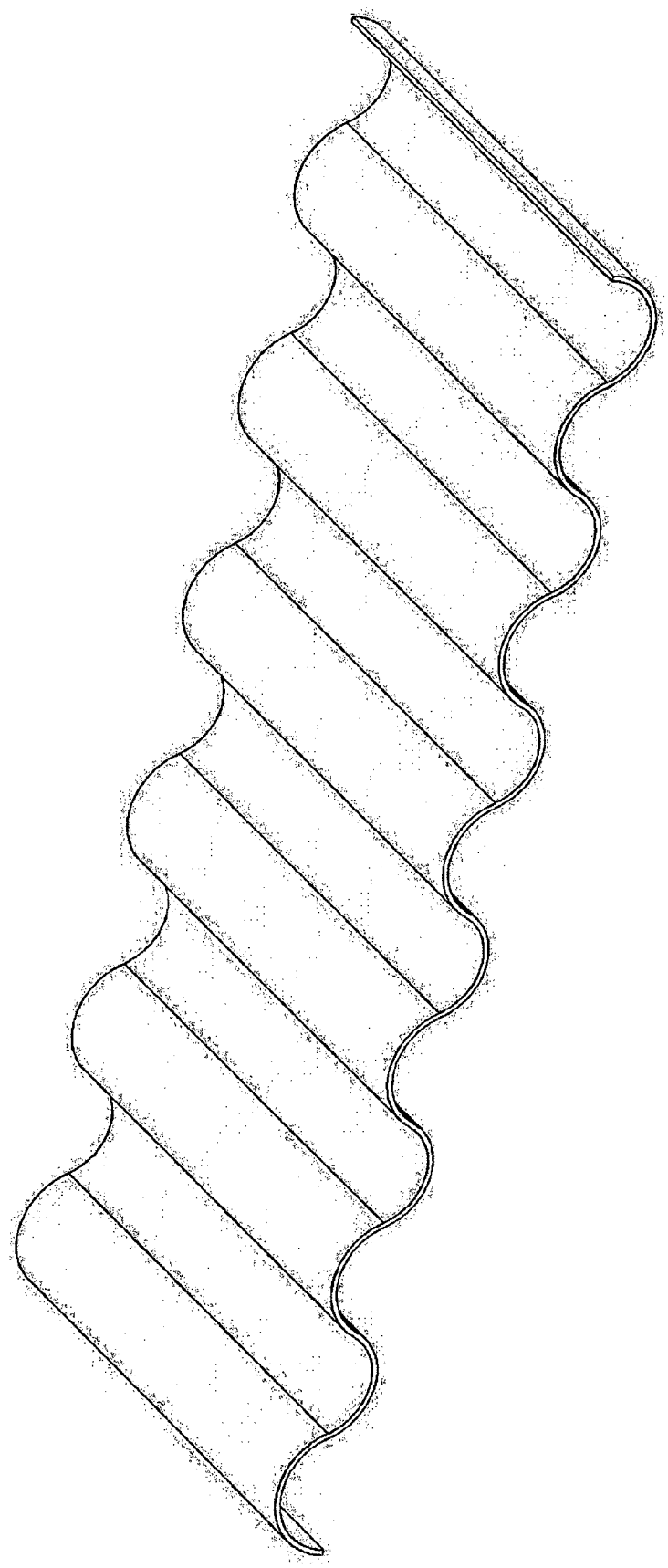
FIG. 4 shows an embodiment of the module having been formed to have a sinusoidal profile to simulate concrete tiling.
Figure 5:
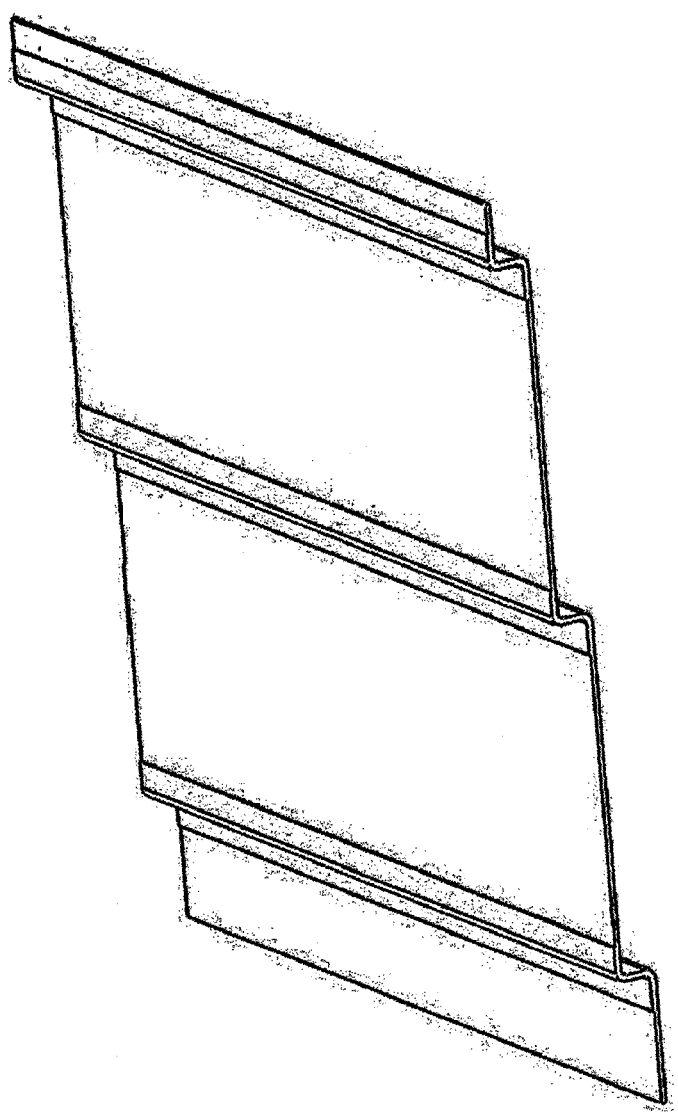
FIG. 5 shows an embodiment of the module having been formed to have a jagged profile to simulate weatherboarding.
Figure 6:
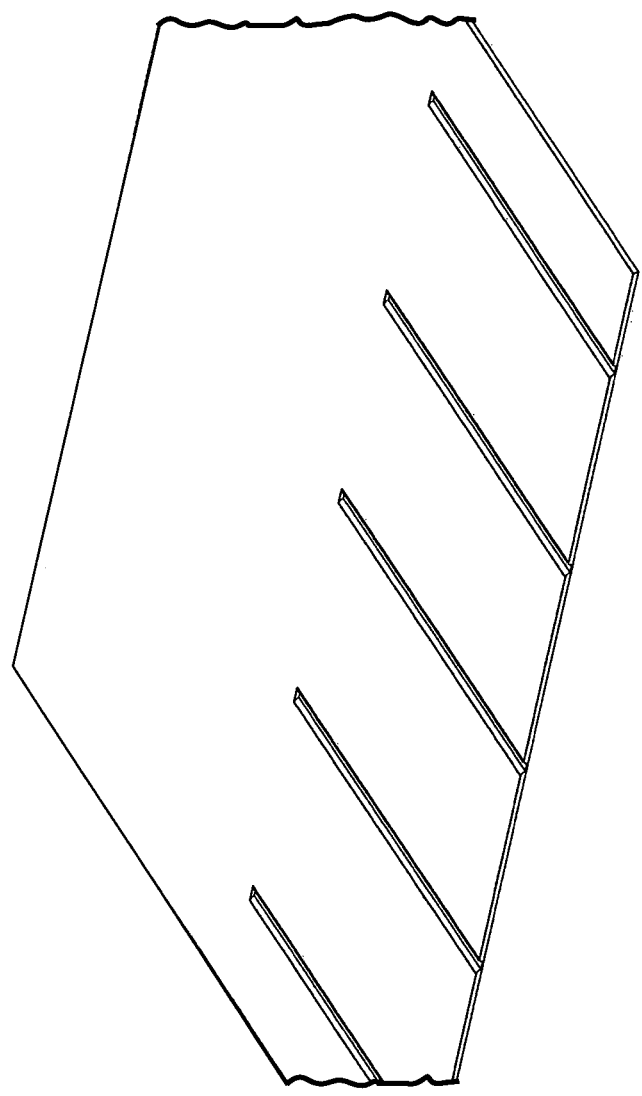
FIG. 6 shows an embodiment of the module having been formed to have relief contours on its upper surface to simulate asphalt shingle.

Variations in the profiling or contouring can be used to create different stylistic or ornamental effects. For example, the module may be moulded with a sinusoidal profile, as shown in FIG. 4, to simulate concrete tiling; an angular profile, as shown in FIG. 5, to simulate weatherboarding; with relief features on its upper surface, as shown in FIG. 6, to simulate asphalt shingles; or with a variable upper surface contour to simulate slate tiling or wooden shakes. The continuous forming process allows a variety of different 3D surfaces to be produced with the same equipment simply by swapping out the die faces on the forming machine as required.

The colour and visual properties of material feeds can be changed fairly easily also just by inputting different materials and additives (particularly colouring additives) at the feeding stage. This means that it is possible to mass manufacture consecutive runs of different types of product (e.g. a product simulating concrete tiles, a product simulating slate tiles and a product simulating asphalt shingles) without significantly altering the equipment on the manufacturing line.

Figure 7:
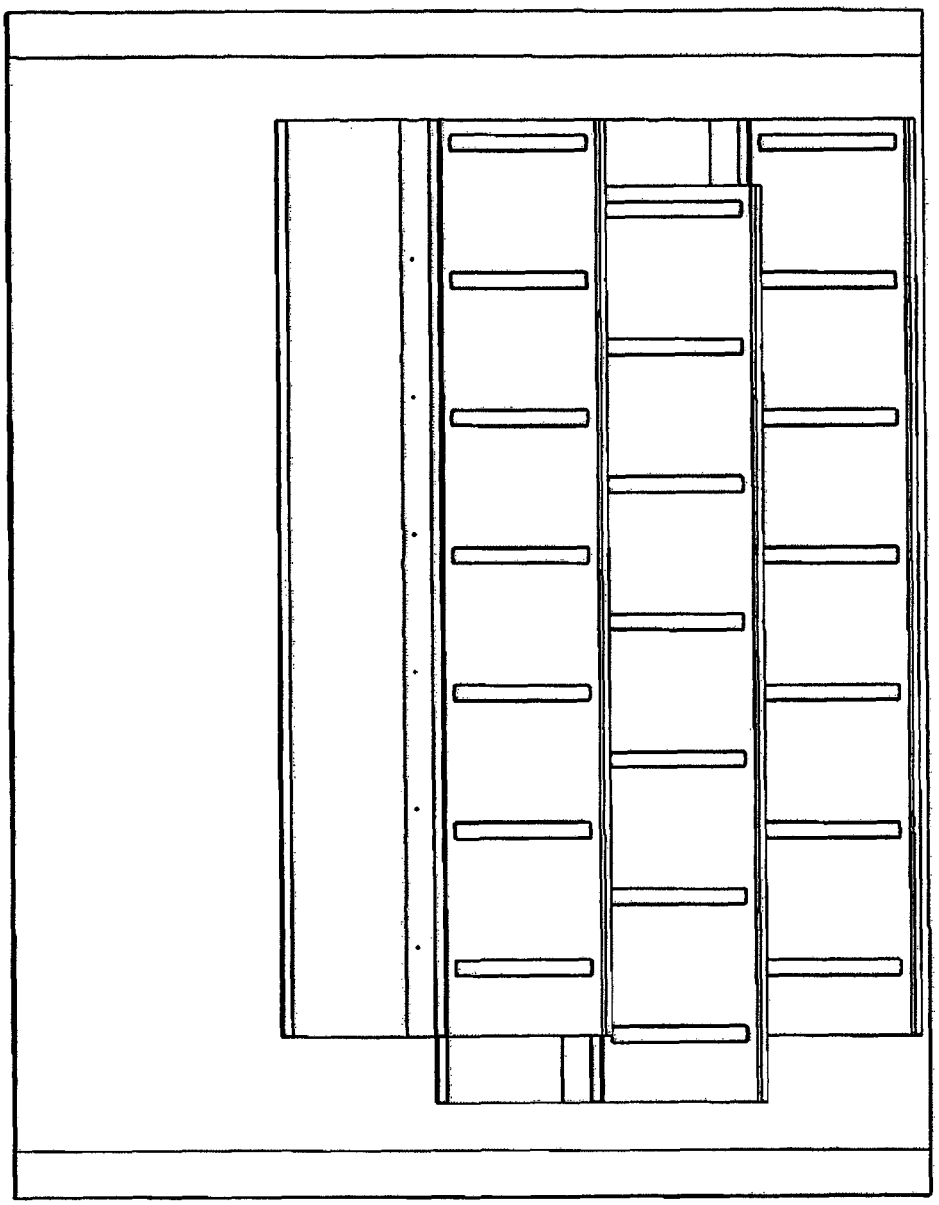
FIG. 7 shows a series of modules fixed in a lapping arrangement with offset vertical alignment for added visual appeal.

The modules may be installed in various vertical alignments as desired and/or as permitted by the surface contouring. The offset vertical alignment shown in FIG. 7 gives the effect of traditional "tiled" roofing, while other alignments will also produce interesting visual and/or stylistic effects.

Figure 8A:
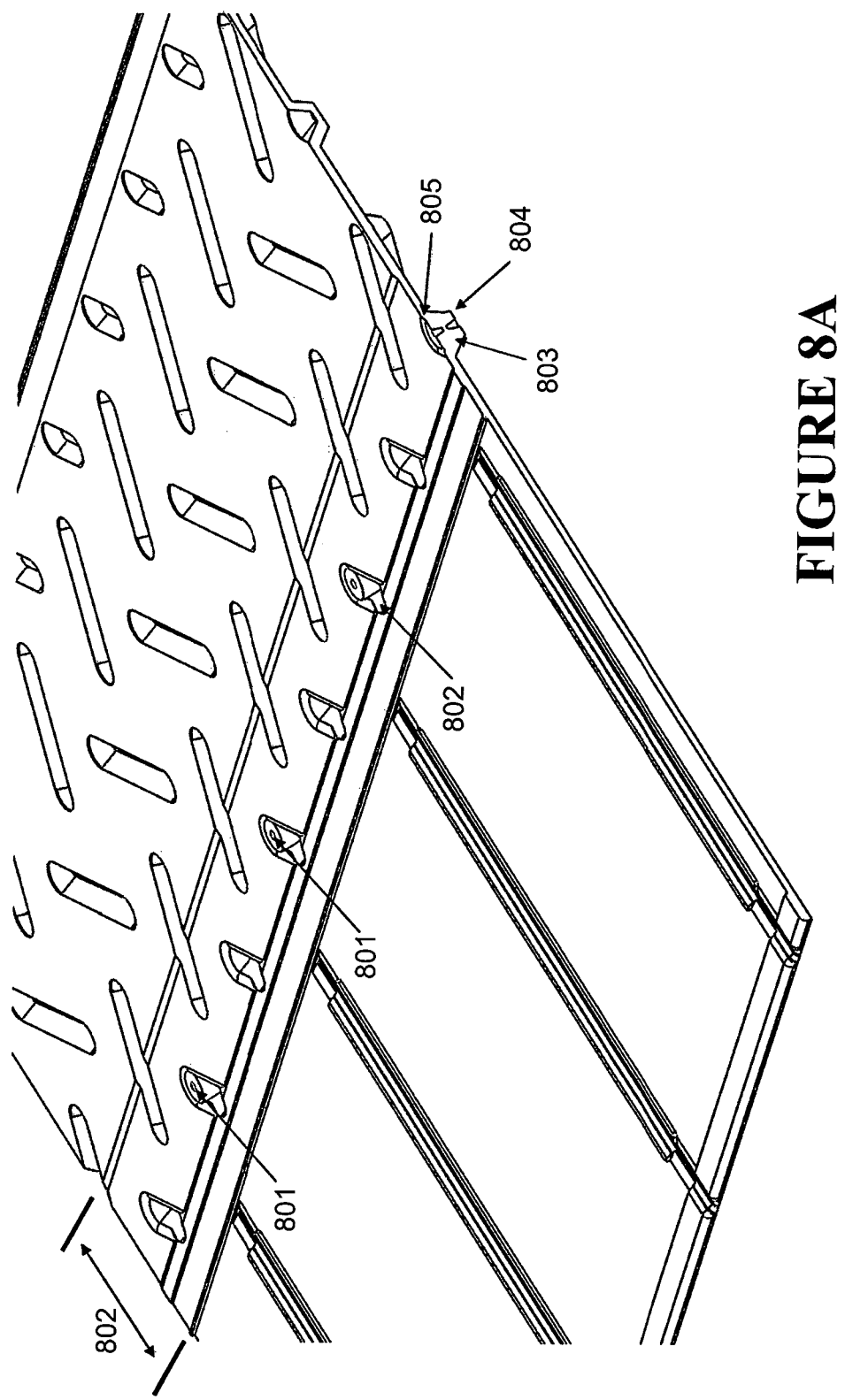
FIGS. 8A-8C show the detail of the fixing region of one embodiment of the module and the locators through which fasteners can be driven to secure the module to the building surface.

FIG. 8A shows a series of locator recesses 801 within the fixing region 802 of a moulded module 800 for locating nail or screw type fasteners. There are bosses 803 (i.e. thickened sections of material) at the bottom of each recess to provide a strong area for the fastener shank to pass through, and these also create a flat surface 804 to butt with the building surface underneath the module. The sides of the recess 805 slope outward so that a hammer or pneumatic nail or staple gun can be used to drive the fastener home without damaging the surrounding module material.

Figure 8B:
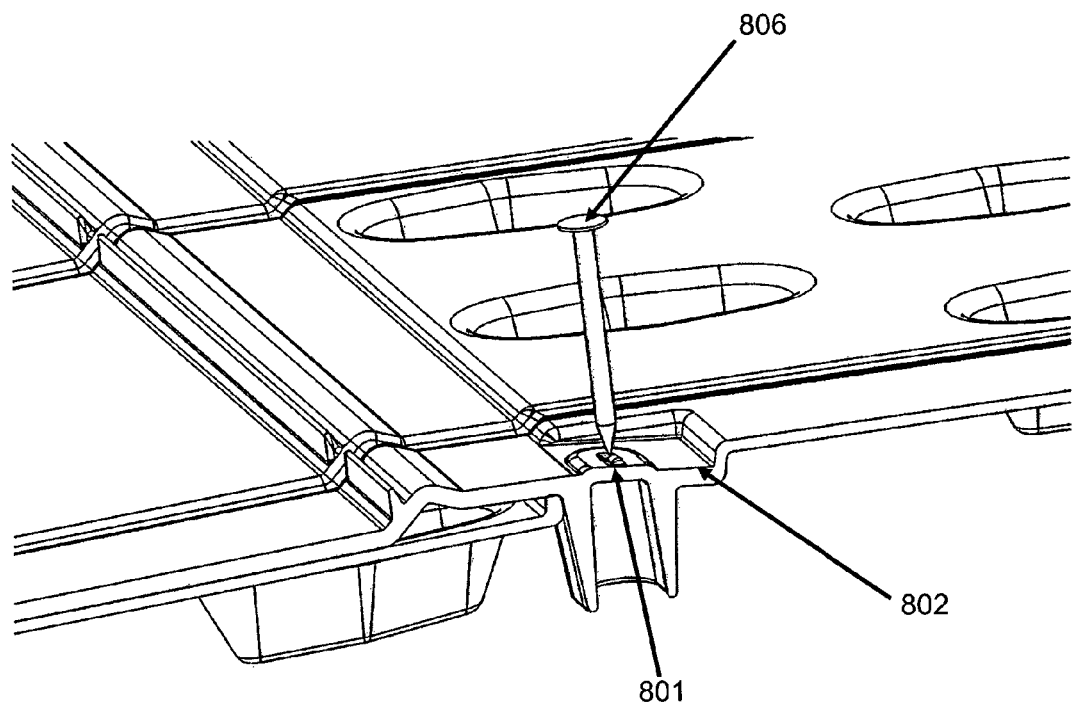
Figure 8C:
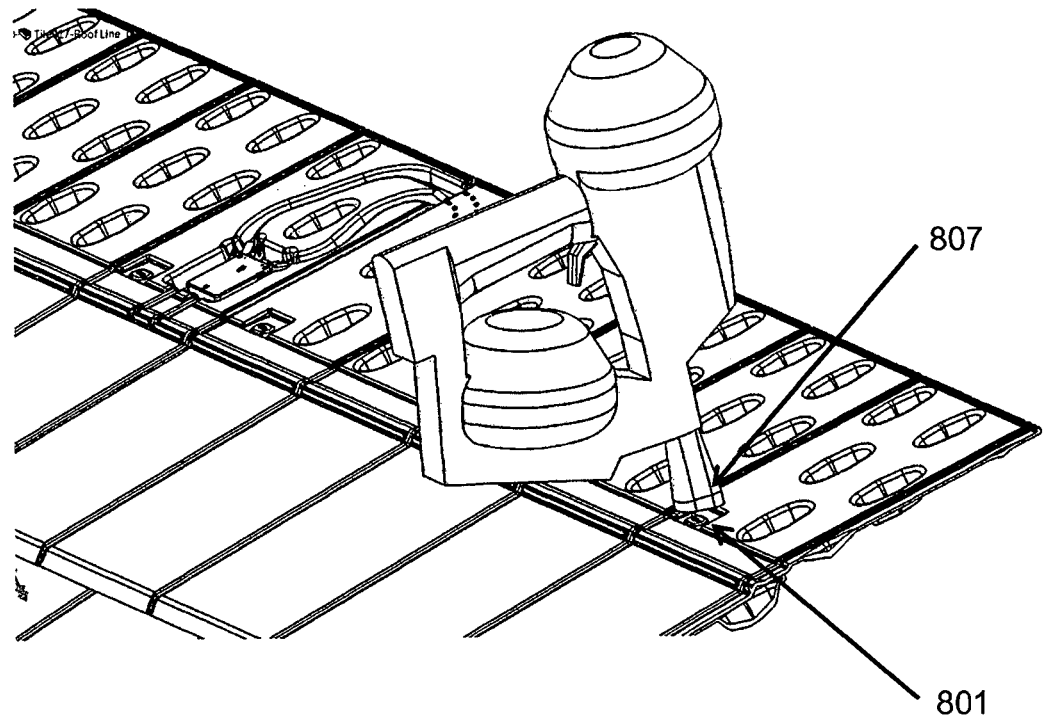

FIG. 8B shows there may be "starter" holes or locators 801 within the fixing region 802 for locating the fasteners 806 (e.g., nails, staples, or screws) which attach the module to the building surface. These locators 801 can be moulded features or extra surface markings. The purpose of such locators 801 is to simplify installation by showing how many fasteners 806 are required and how far apart they ought be spaced. Furthermore, as shown in FIG. 8C, the locators 801 may include recesses that are adapted to fit conventional nail or screw gun heads 807. This provides easy alignment and accurate location of the fastener for the installer. There may be a layer of reinforcement material covering the fixing region of the module to prevent the module material from tearing where it is penetrated by the fasteners, in which case the locators can serve to ensure that the fasteners are positioned within the reinforced zone.

Figure 9:
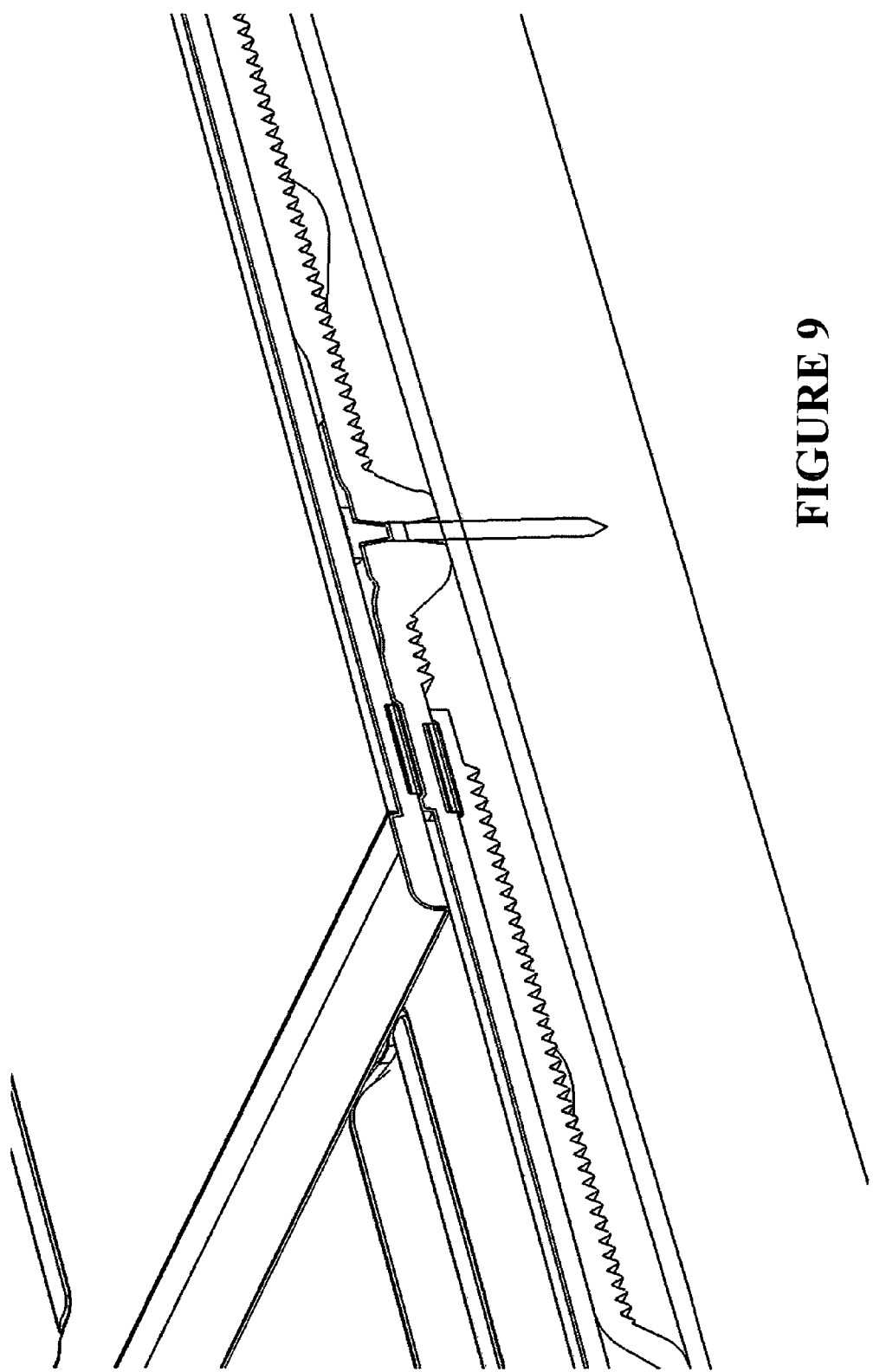
FIG. 9 shows a nail type fastener sitting within a locator recess sealed off by an overlapping module.

Once the module is fixed to the roof the head of the fastener should be flush with or sit below the top of the locator opening. As shown in FIG. 9, this allows the overlapping region of a subsequently affixed module to sit flat over top of the first module.

Figure 10:
FIG. 10 shows an illustrative embodiment of the roofing module which has been moulded to have a precamber.
Figure 11A:
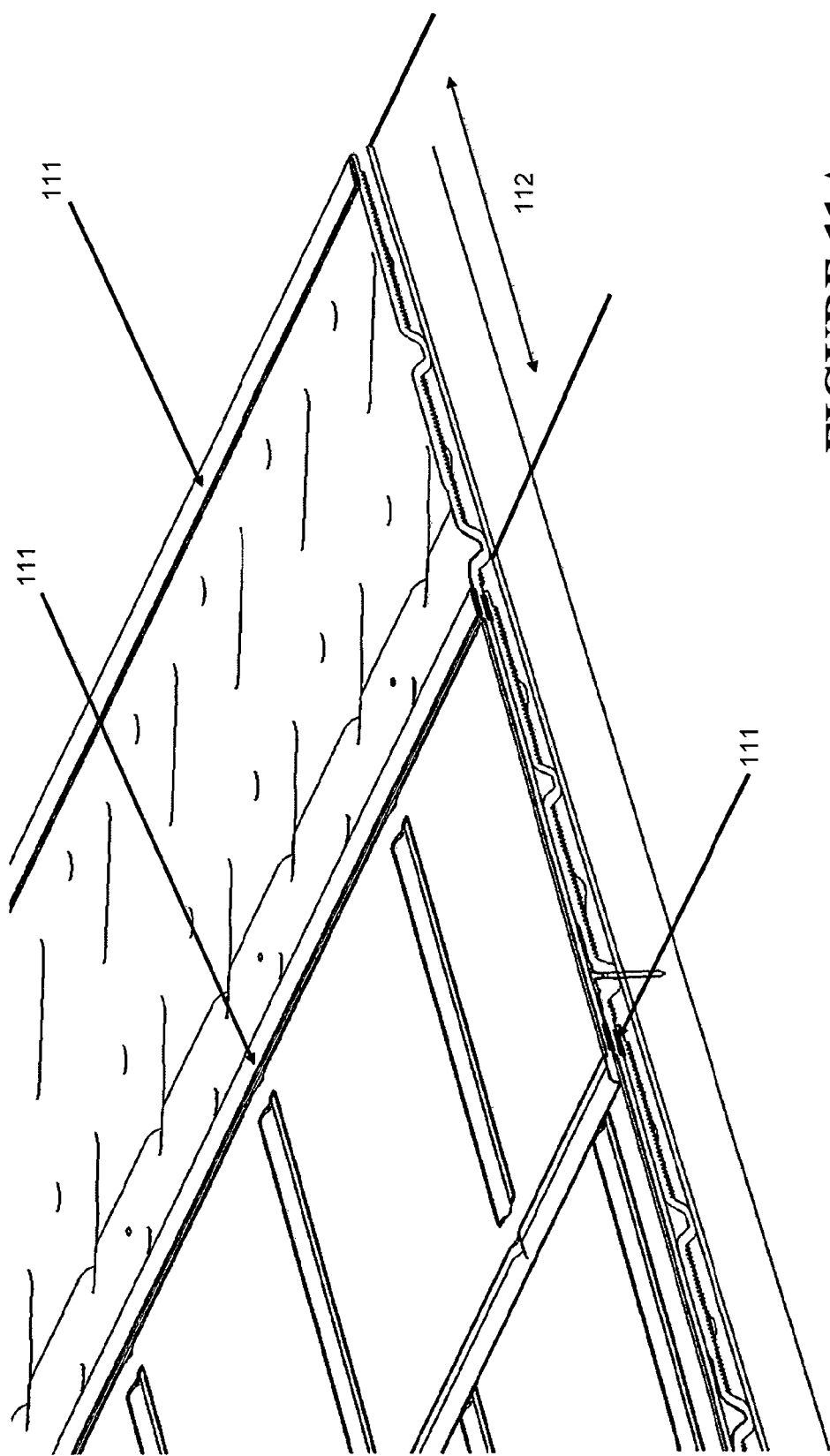
FIG. 11A shows an embodiment of the module which includes adhesive strips for securing the modules to create a weathertight seal.

The module may be formed with a convex precamber (as shown in FIG. 10) to apply a pre-load pressure to encourage the edges and bottom surface of the overlapping panel to contact firmly onto the underlapping panel when installed on a building. This also provides high thermal conductivity between the underlapping panel and the overlapping panel. Additionally, adhesive strips 111 (shown in FIG. 11A) running along the length of each module can be used to connect one module to the surface of the next, creating a waterproof seal and stopping grit and particulates from working their way under the roofing or cladding layer. There is also an advantage to securing those regions of the module which are farthest from the fixing region so that the exposed portions of the module cannot flap up in the wind and cause damage through fracture or bending stresses. This may be done with adhesive strips or by other means. If adhesive strips are used, it may be beneficial to have them covered by release strips 113 for transport and storage (as showing in FIG. 11B). The release strips would be removed during installation.

Figure 12:
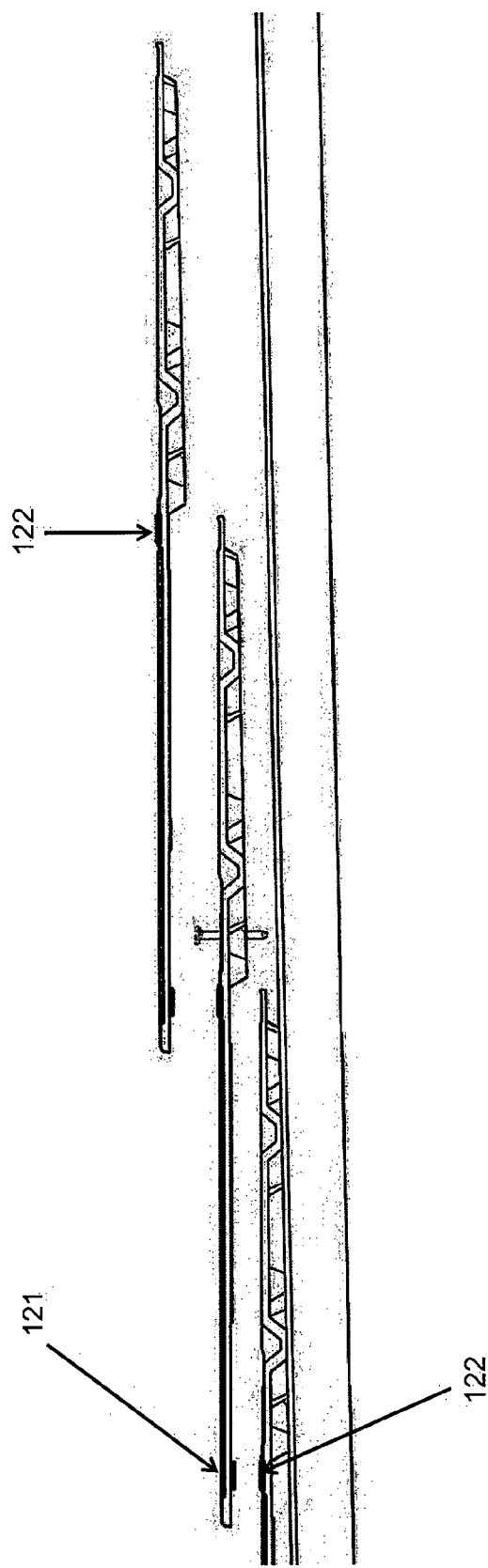
FIG. 12 shows an embodiment of the module where a first adhesive strip is affixed along the lower edge of the module on the back side of the moulded material layer, while a second is affixed to the top side just below the line of the fixing region.

The placement of the adhesive strip(s) on the module can vary. As shown in FIG. 12, in one embodiment, a first adhesive strip 121 is affixed along the lower edge of the module on the back side of the moulded material layer, while a second 122 is affixed to the top side just below the line of the fixing region. Thus a series of modules can be arranged as shown in FIG. 12, where the strip on the back side adheres to the strip on the front side.

Figure 13A:
FIG. 13A shows an alternative embodiment wherein the adhesive strips are positioned so that both strips are on the front of the module; one at the rear edge and one just below the line of the fixing region.

Alternatively, as shown in FIG. 13A, the adhesive strips can be positioned so that both strips are on the front of the module; one at the rear edge 131 and one just below the line of the fixing region 132. In this case the adhesive will secure two points of the module and will adhere directly to the substrate layer of the overlapping module. A further alternative or addition is to apply an adhesive paste to the region 112 during installation.

Figure 13B:
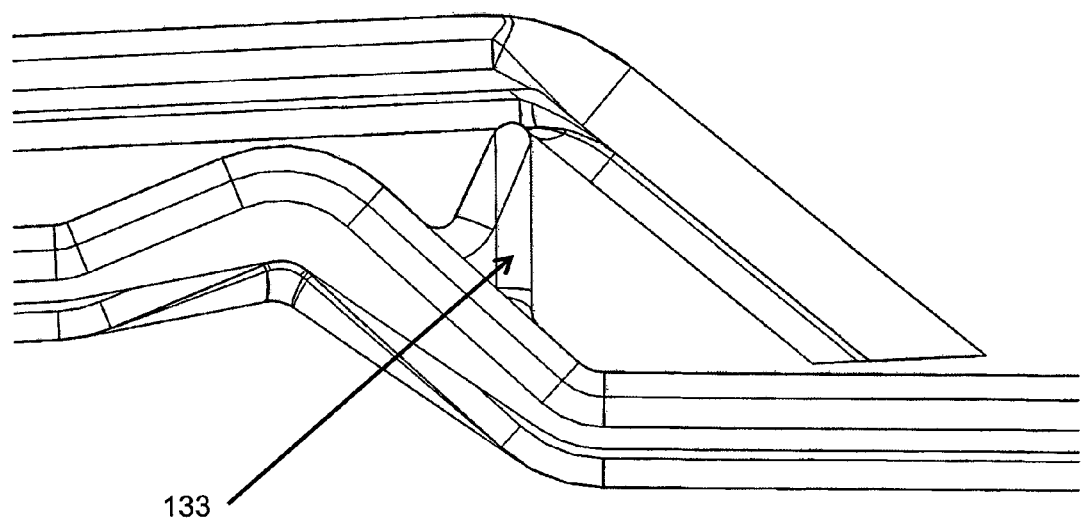
FIG. 13B shows an embodiment where a strip of material on the upper surface of the underlapping region serves as a weather-tight barrier.

As shown in FIG. 13B, the module may be pre-formed with a strip of material 133 on the upper surface of the underlapping region that serves as a weather-tight barrier when placed into contact with an adjacent module. This flexible strip of material 133 prevents the backflow of water or air in between the overlapping modules. A further alternative or addition is to place a similar strip of polymeric material on the lower surface of the exposed region, to prevent water from penetrating between the two overlapping modules.

Figure 14:
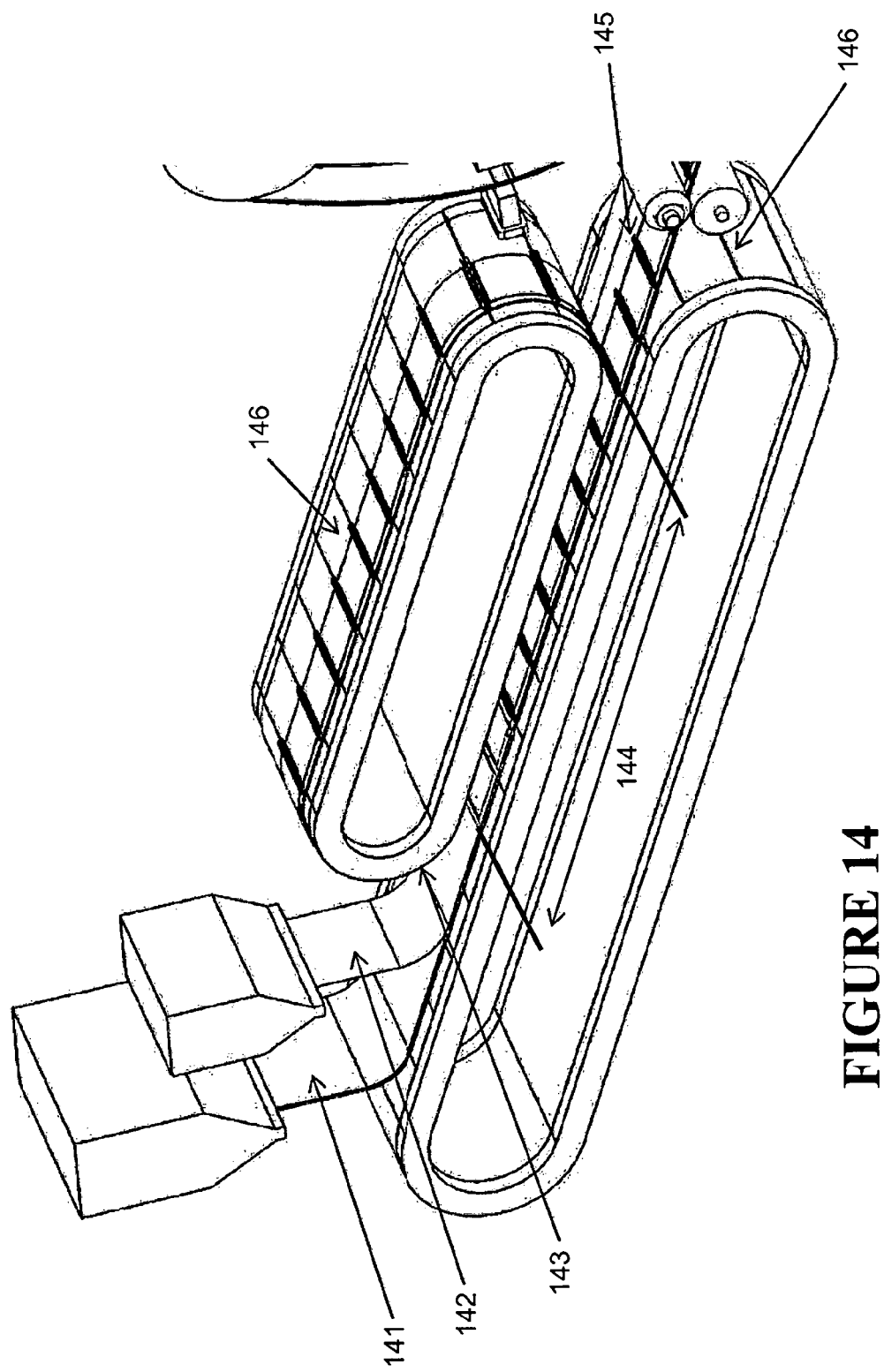
FIG. 14 shows diagrammatically a continuous forming apparatus contemplated as providing for the continuous forming of various modules described herein.

In one embodiment, a sequence of steps in the manufacture of the roofing and/or cladding product is to firstly prepare the module material for forming (which may involve bringing the material to a molten, semi-molten or pliable state), secondly, feeding the material to a pressure forming zone, and thirdly, forming and setting the material as it advances through the pressure forming zone. While there are various methods of mixing and presenting the materials prior to forming, a suitable method is to deposit an extruded feed layer of a first material 141 onto an advancing support surface of a continuous forming machine, and to subsequently introduce a further extruded feed layer of another material 142 overtop of this, as shown in FIG. 14. The first material and the second material or additional may be the same or different, and may be of the same or different form. Both materials then proceed as a layered feed 143 to the pressure forming zone 144, and are moulded into a single module panel 145. The product can be manufactured so that there are different features on the top of the moulded panel to those on the bottom by using different dies in the upper and lower rotating tracks 146 of the CFT machine. The modules can also be manufactured using a single material only.

Figure 15:
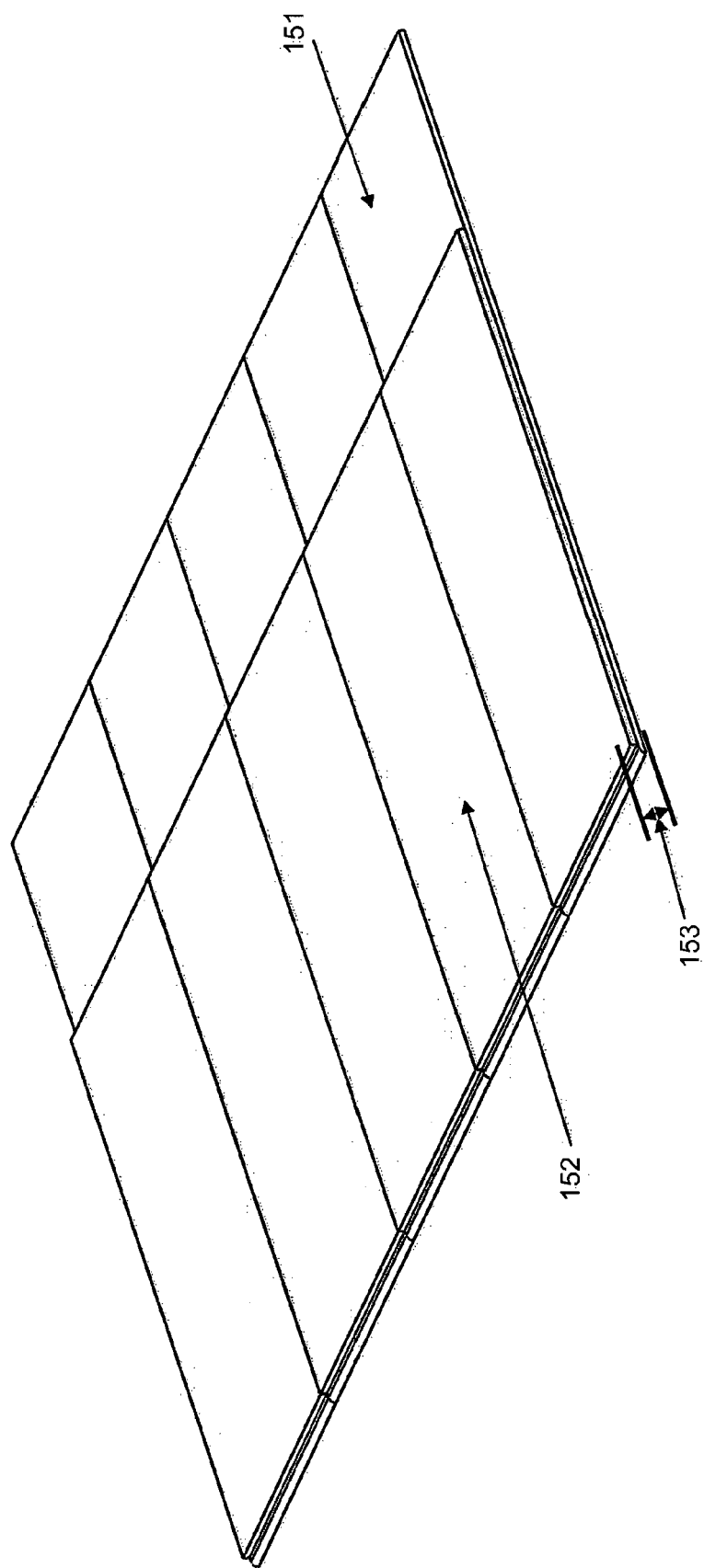
FIG. 15 shows a module wherein a second layer of material has been formed overtop of, but not entirely covering, a first layer of material.

Upon arrival at the pressure forming zone it may be that the second material feed entirely covers the first, however the feeds may be arranged so that only a portion of the first feed 151 is covered by the second 152 (as in FIG. 15). There may only be a thin strip of the second material or additional material on top of the first or second feed, and the positioning of the strip across the width of the first feed can vary.

These variations can be achieved during manufacture by changing the positioning of the various extruders relative to each other and by altering the width of the feeds.

In some embodiments, the first material layer has a width WI and a thickness TI and the second material layer has a width W2 and a thickness T2. In one embodiment, WI is wider than WII. In one embodiment, WI and WII are of equal widths. In one embodiment, WII is wider than WI. In one embodiment, TI is thicker than TII. In one embodiment, TI and TII are of equal thickness. In one embodiment, TII is thicker than TI. In one embodiment, WI and WII are within the range of 5 centimeters to 3 meters. In one embodiment, TI and TII are within the range of 0.1 to 100 millimeters.

Additional material layers (whether extruded, roll fed, or otherwise presented) can also be added prior to or after the forming process. This allows for the continuous forming of a multi-layered product, each material layer having a particular set of properties which are advantageous to the product. In particular, it may be desirable to add one or more reinforcing layers to the product. Such layers may comprise a metal, cloth or fibreglass mesh, jute or other fabric, glass fibre, carbon fibre, aluminium sheet or a reinforcing polymer. These can be laid beneath, on top of, or in between the other material layers prior to the forming step, and may or may not undergo deformation during the forming step. The thickness of the module panel 153 produced will be determined in part by the materials selected and the number of layers fed in. In one embodiment the thickness of the panels may be within the range of about 0.5-55 mm.

The various layers of material may chemically bond together prior to or during the forming step, however their ability to do so will depend entirely on the materials selected. Where the materials selected are not prone to chemical bonding, it may be necessary to assist adhesion with a plasma or adhesive layer; or to feed in a supplementary material with a chemical affinity for both of the material layers. This can be applied in-line as an interposing layer or deposit atop the first substrate material feed prior to the introduction of the second. The various layers of material may also mechanically bond together due to the surface finishes or features between the layers.

A similar product can be achieved by the segmental injection moulding of the roofing and/or cladding modules, however such a process has a much slower output capacity. Large areas of product need to be produced for building applications and it is desirable to be able to produce these large surface area products in high production volumes to make the process economical. Moreover, such a process would result in a product containing weld lines and injection moulding points. Weld lines are formed when two or more molten polymer flows meet during the injection molding process. This can occur when a polymer flow splits to go around an interruption (e.g., a post that forms a hole) and then rejoins, or when polymer melt fronts meet, from multiple injection points. This can also occur when molten polymer meets a non molten polymer. Consequently, a visible weld line is observed and the adhesion/bond in this weld line at the interface is weaker than the balance of the polymer within the product. Injection moulding points are the area of a product where the heated material was fed into the mold cavity. It is also difficult to make a product comprising more than one layer of material using injection moulding, and injection moulding can produce colour differences or variations that affect the aesthetics of the final product. On the other hand, the continuous forming machine can produce approximately 5-60 m of product per minute, which makes it a preferable to use this production method over other processes which could be used to manufacture a 3D polymer product. The continuous forming machine also produces a product that lacks weld lines or injection moulding points, and optionally contains multiple layers of material.

A number of materials are suitable for use in the production of a roofing and/or cladding product by a continuous forming process; however it is most cost effective to produce the moulded panel from a foamed material (e.g. foamed polycarbonate). Not only does this reduce the amount of raw material required for production, but also results in a lightweight product. This can be advantageous in the retrofitting of roofing or cladding to an existing building. For example, where there is a building with an existing but degraded roof, re-roofing can occur by placing the new lightweight shingle directly over top of the existing shingle (usually asphalt shingle).

The foamed polycarbonate (or alternative substrate material) may be accompanied by one or more additional materials to enhance the properties of the product. A suitable material is Thermoplastic Polyurethane (TPU), which can be fed into the moulding process along with the polycarbonate as shown in FIG. 14. Foamed polycarbonate and similar materials are favoured in roofing products because they have fire retardant properties, but the addition of a TPU layer improves the performance of the product because the TPU has better durability, physical properties and resistance to environmental wear. In particular, TPU is puncture resistant, tear resistant, and UV resistant, and will retain the aesthetic appeal of the product for a longer period of time compared to polycarbonate alone.

Figure 16:
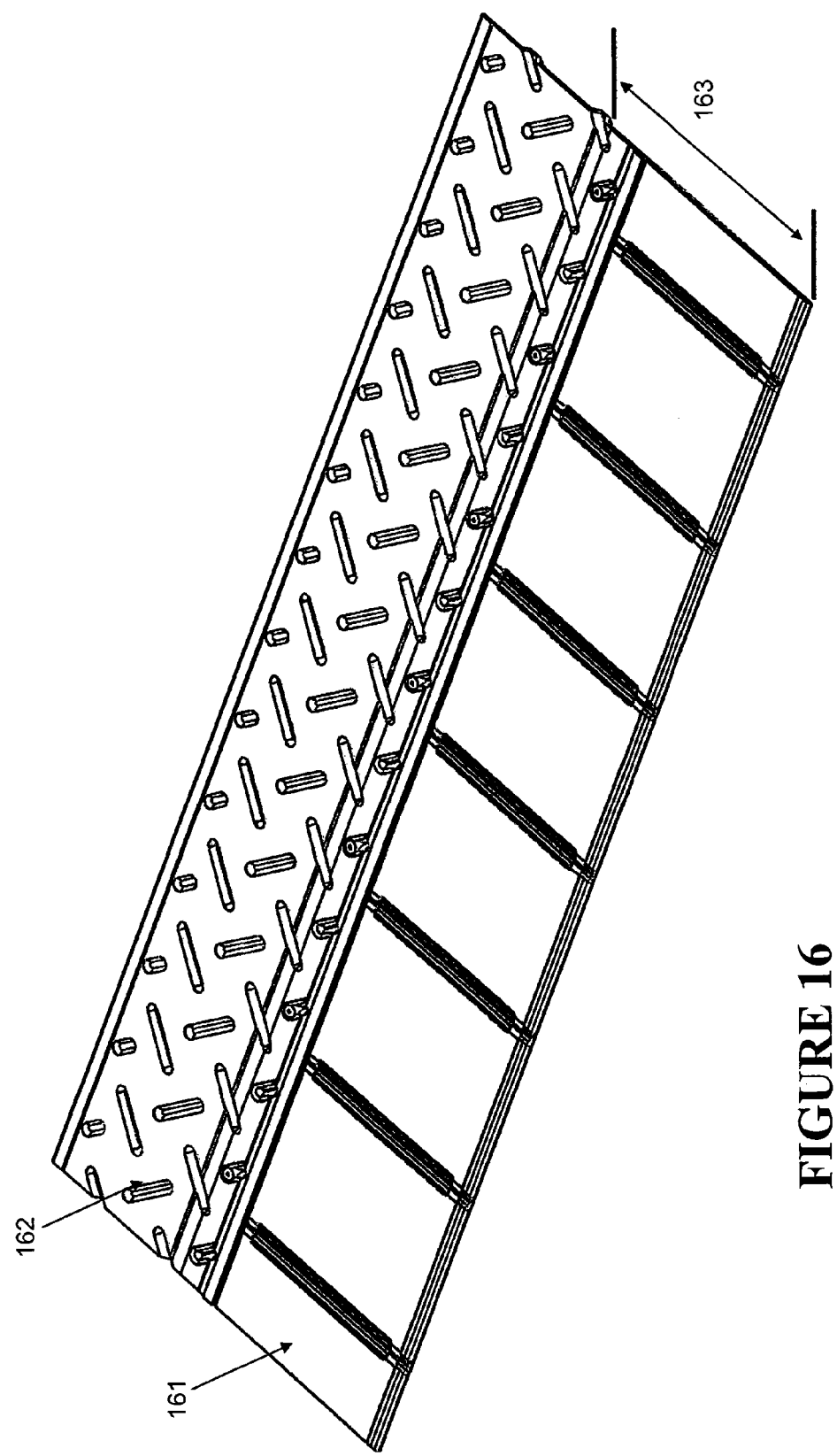
FIG. 16 shows an illustrative embodiment of a module wherein a thermoplastic polyurethane layer has been formed along with, and on top of, a foamed polycarbonate layer, to give product characteristics desirable for a roofing shingle.

The panel at its point of exit from the forming step is shown in FIG. 16. The TPU layer (or a layer of alternative material) 161 is moulded on top of the polycarbonate (or other foamed material) layer 162 to form the body of the shingle module. While it is desirable to use as much foamed material as possible to reduce materials, in some embodiments, the TPU layer may cover the region 163 which extends from the lower edge of the shingle up to a line above the fastener fixing region. This is so that the areas of the shingle exposed to the elements will have good durability, and all of the areas of the shingle penetrated by fasteners will have good tear resistance. An advantage to using TPU in this instance is that the TPU, once punctured, will tend to contract around the shank of the fastener to make a watertight seal.

Other materials which may be used include (but are not limited to) polycarbonate (PC), general purpose polystyrene (GPPS), polymethyl methacrylate (PMMA), polyethylene terephthalate (PET), polyester methacrylate (PEM), polypropylene (PP), high impact polystyrene (HIPS), acrylonitrile butadiene styrene (ABS), polyester (PES), polyamides (PA), polyvinyl chloride (PVC), polyurethanes (PU), polyvinylidene chloride (PVDC), polyethylene (PE), polytetrafluoroethylene (PTFE), polyetheretherketone (PEEK) (polyetherketone), polyetherimide (PEI), Polyimide (PI), polylactic acid (PLA), high impact polystyrene, acrylonitrile butadiene styrene (ABS), acrylics, amorphous polymers, high density polyethylene (HDPE), polyethylene terephthalate (PET), low density polyethylene (LDPE), linear low density polyethylene (LLDPE), medium density polyethylene (MDPE), cross linked polyethylene (PEX), Ethylene vinyl acetate (EVA), Ethylene vinyl alcohol (EVOH), thermoplastic elastomer (TPE), thermoplastic polyolefin (TPO), thermoplastic rubber (TPR), polypropylene (PP), Fluorinated ethylene propylene (FEP), Polybutylene terephthalate (PBT), Polyoxymethylene (POM), Polyphenylene oxide (PPO), Polypropylene homopolymer (PP-H) Polypropylene copolymer (PP-C), silicon polymers, styrene-acrylonitrile resin (SAN) and thermoplastic rubber. The materials may be a blend of any or all of these. The materials may also comprise additives to enhance properties such as resistance to fracture, impact, ultraviolet light, and thermal or tensile stresses. Materials which could also be considered in manufacture are various polystyrenes, nylons, acrylics, polyethylene, thermoplastic ethylene, polypropylene and phenolic, and combinations of or containing these. No matter which materials are chosen, the materials must be compatible so that they do not delaminate. If the materials are not compatible, they may still be used; however, a tie or bond layer must be introduced between them. Examples of tie or bond layers include, but are not limited to, ethylene vinyl acetate (EVA), thermoplastic polyolefin (TPO), thermoplastic elastomer (TPE), silicon adhesives, epoxy adhesives, and acrylic adhesives. One of skill in the art is capable of choosing materials in the appropriate combinations to suit the purposes described herein.

In various embodiments, the roofing module is flame resistant, resistant to tearing (especially at puncture and attachment points), able to be easily and cleanly cut with everyday tools to aid installation, able to endure environmental and UV exposure for over 20 years, able to endure cyclic freezing and thawing without failure, resistant to delamination at temperatures of between −40 and 100 degrees Celsius, impact resistant to a reasonable extent, impenetrable by water even at fixing points, low density, resistant to penetration and abrasion, colourfast, resistant to microbial attack, compatible with adhesives and made of materials which are stable in high humidity and wet conditions and which retain their pliability at high and low temperatures and which do not delaminate. All of these factors come into play when choosing appropriate materials or material combinations for the manufacture of the product. It is also desirable that the material(s) used are non-toxic, or that at least the upper layers of the product are (if a layered product is produced). This avoids the prospect of toxic contamination in the event that water is to be collected from one or more building surfaces for subsequent use.

In some embodiments, the product may be produced from a recyclable material or several different recyclable materials. The combination of materials chosen in the manufacture of the product is suitably one that can be recycled without first having to dismantle the product into its constituent materials.

Figure 29A:
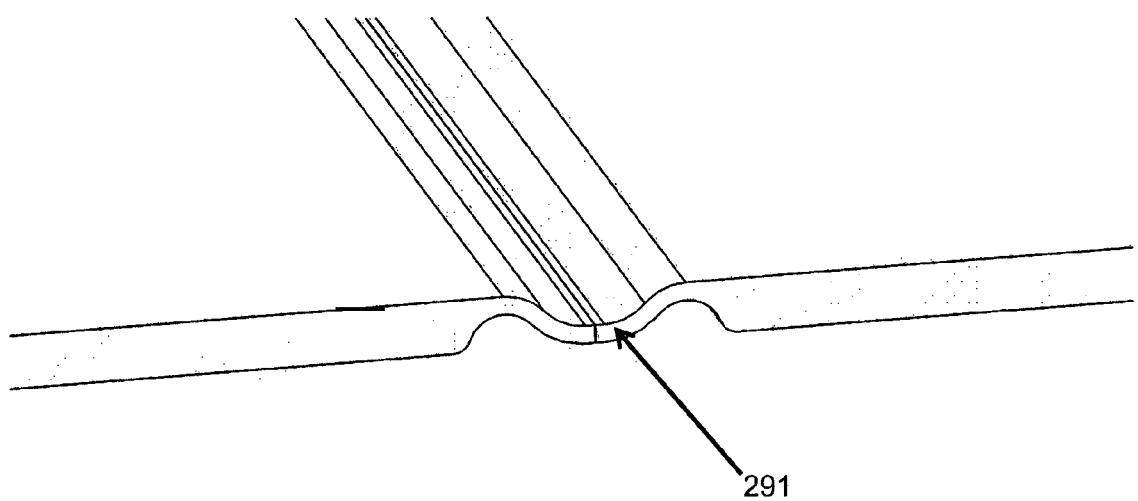
FIG. 29A shows the detail of a concertina feature designed to accommodate thermal expansion and contraction of the module.
Figure 29B:
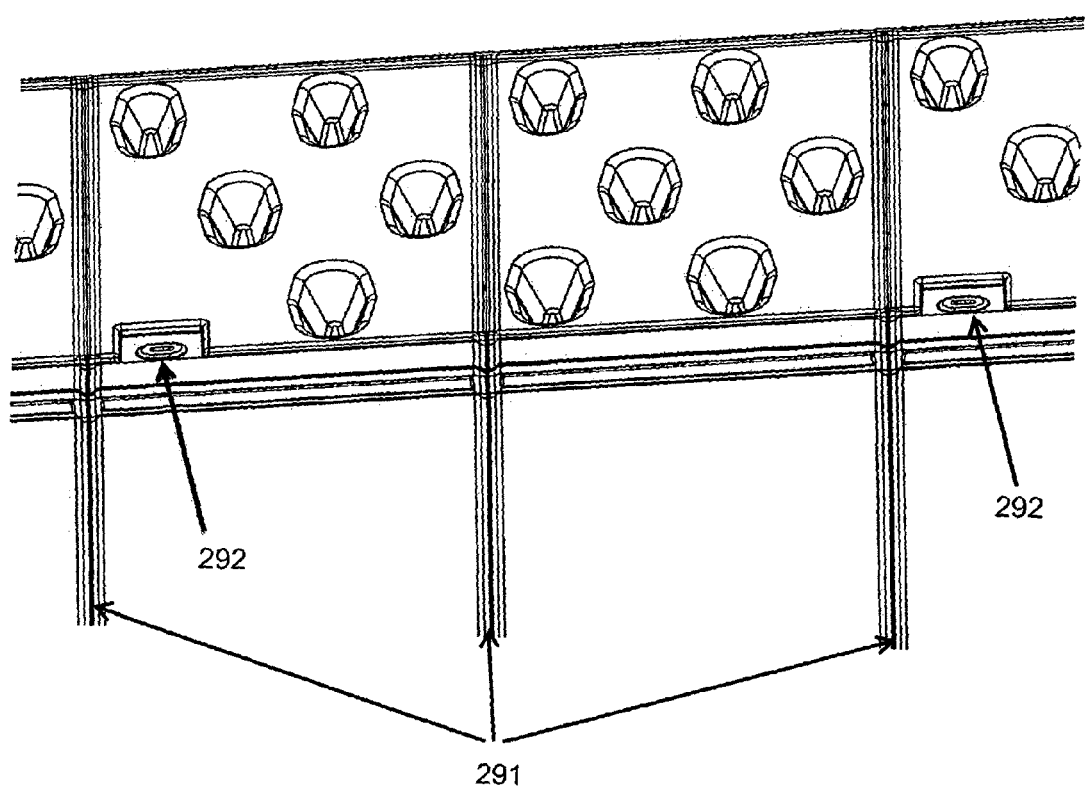
FIG. 29B shows the detail of the concertina feature placed between two fixing points.

It is also important to choose a material with a low co-efficient of thermal expansion to avoid warping along the length of the product. If the material undergoes too much movement once attached to the building surface it may fail at or between the attachment points. Failure can also be a problem if a layered product is produced with two or more materials having vastly different thermal expansion co-efficients. In one embodiment, as shown in FIGS. 29A-29B, thermal expansion and contraction can be accommodated by moulding each module to have one or more concertina-shaped features 291 that will expand or contract between two fixing points 292.

In various embodiments, the roofing or cladding module may incorporate additional properties or functionalities, including but not limited to: a photovoltaic functionality; and/or (iii) interconnection functionalities of photovoltaic areas, as described in further detail below.

An alternative embodiment of the roofing and/or cladding product of the current invention is one that has all of the previously described features, along with several additional features that make the product suitable for use as part of a thermal energy recovery system. The thermal energy can be obtained from a building surface that has been exposed to sunlight for a period of time, although there are other less significant sources that may contribute. The thermal energy can then be exhausted or transferred to a passing fluid flow (air being the most practical option) between the product and the building surface, and subsequently used elsewhere in the system.

A notable feature of this embodiment is that the building underlay forms one boundary of the airway path. This embodiment is different from box, round or other geometric closed cross section shapes e.g. Corflute® roof or similar products, which are segmented into confined zones for airflow that can become blocked. The overall cost of materials is also reduced compared to box, round or other geometric closed cross section shaped roofing materials, which contain a backing material to define a self-contained pathway for airflow. By contrast, this embodiment regards the whole roof as one large surface of airflow, with the cavity for airflow bounded on one side by the modules and the roofing underlay on the other side.

Figure 17:
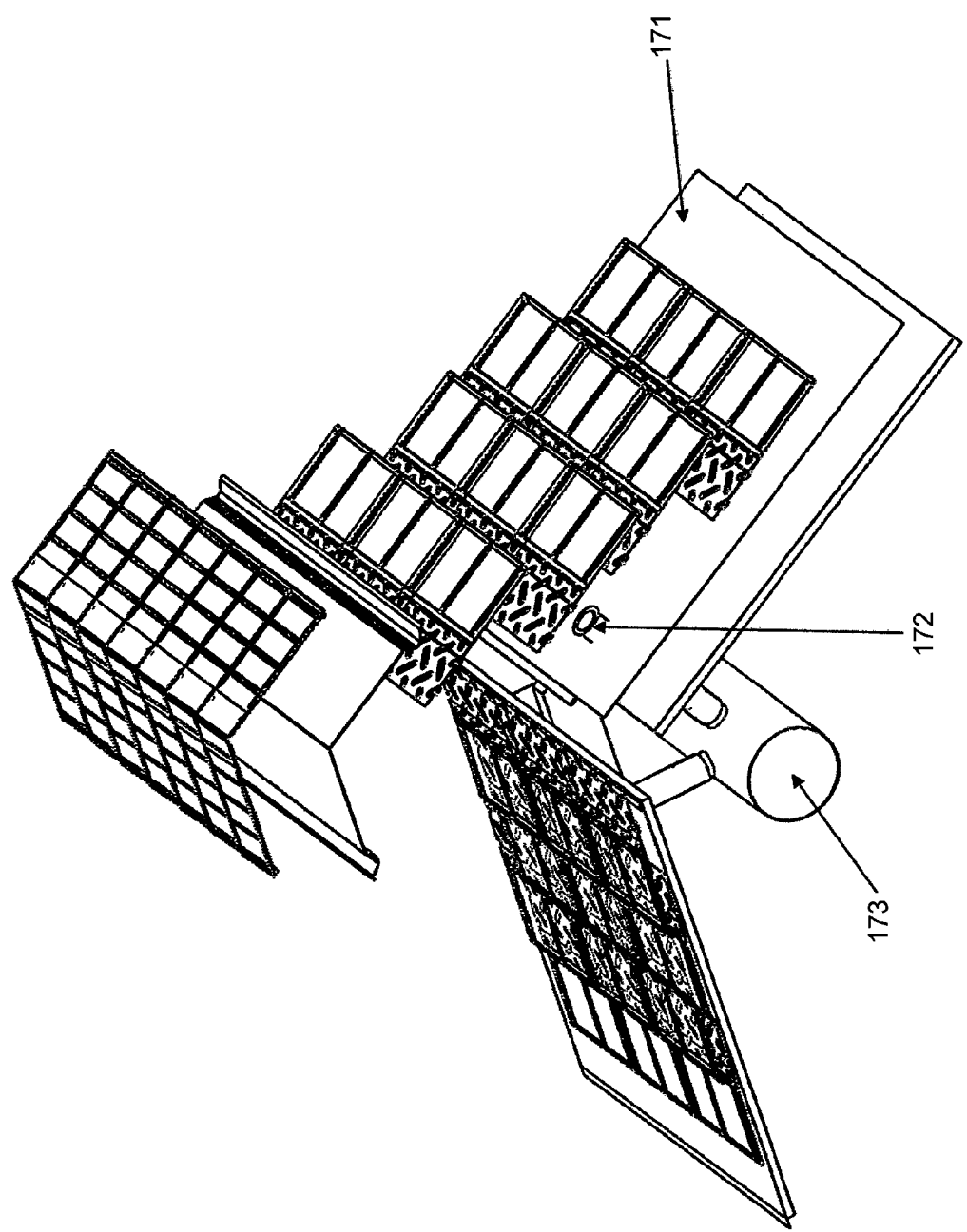
FIG. 17 is an exploded view of a roofing assembly to be used in the collection of thermal and/or solar energy.
Figure 18A:
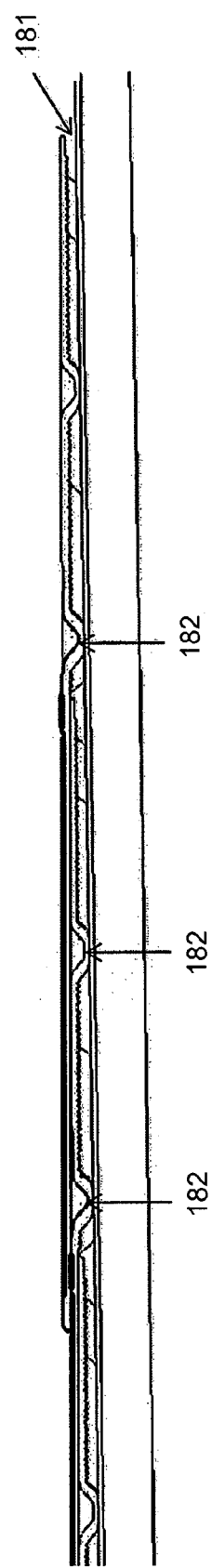
FIG. 18A is a side on view of the module assembly of FIG. 17.
Figure 18B:
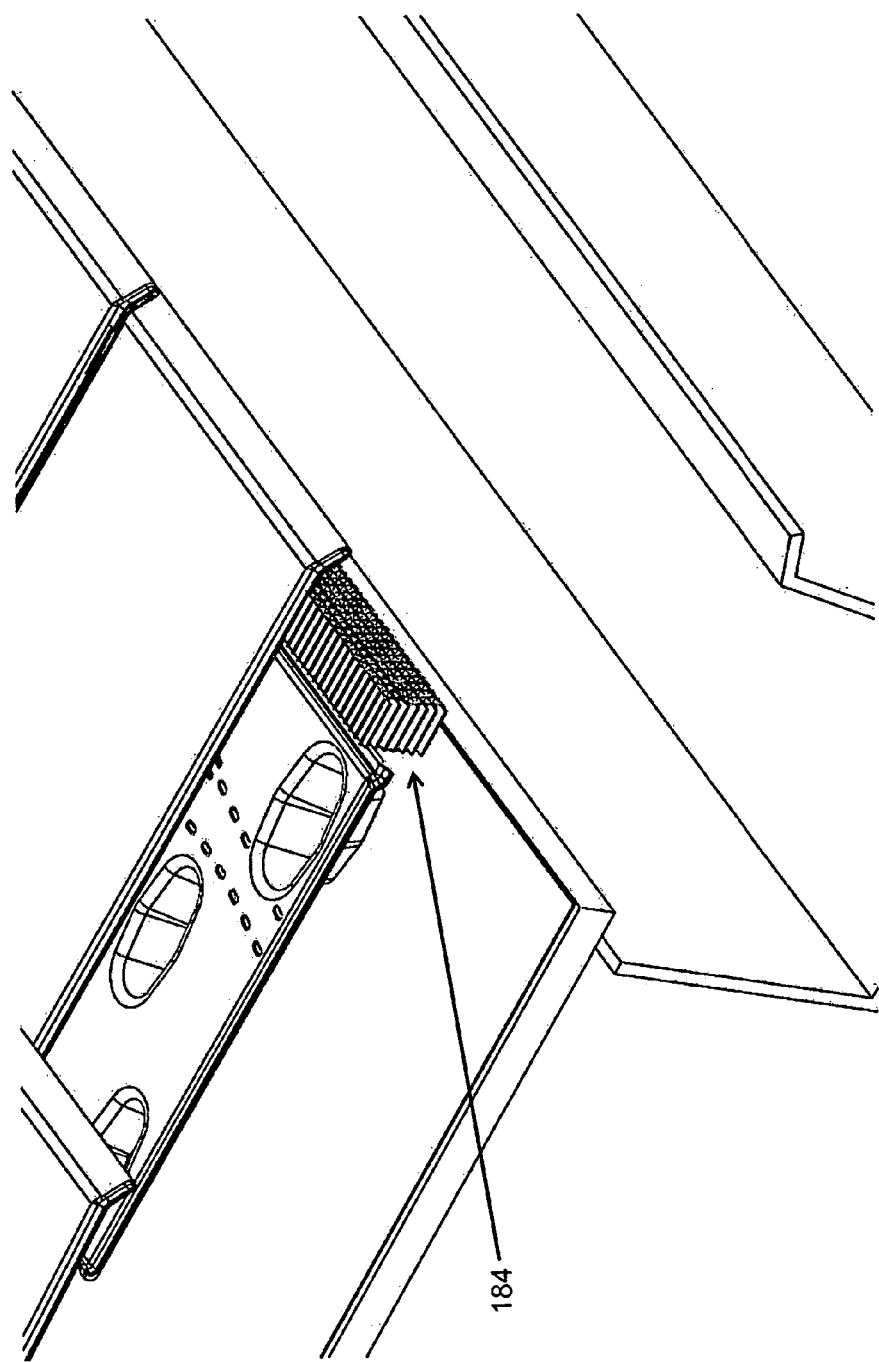
FIGS. 18B-18C shows a cross-section of the module and air filter at the edge of a building surface.
Figure 18C:
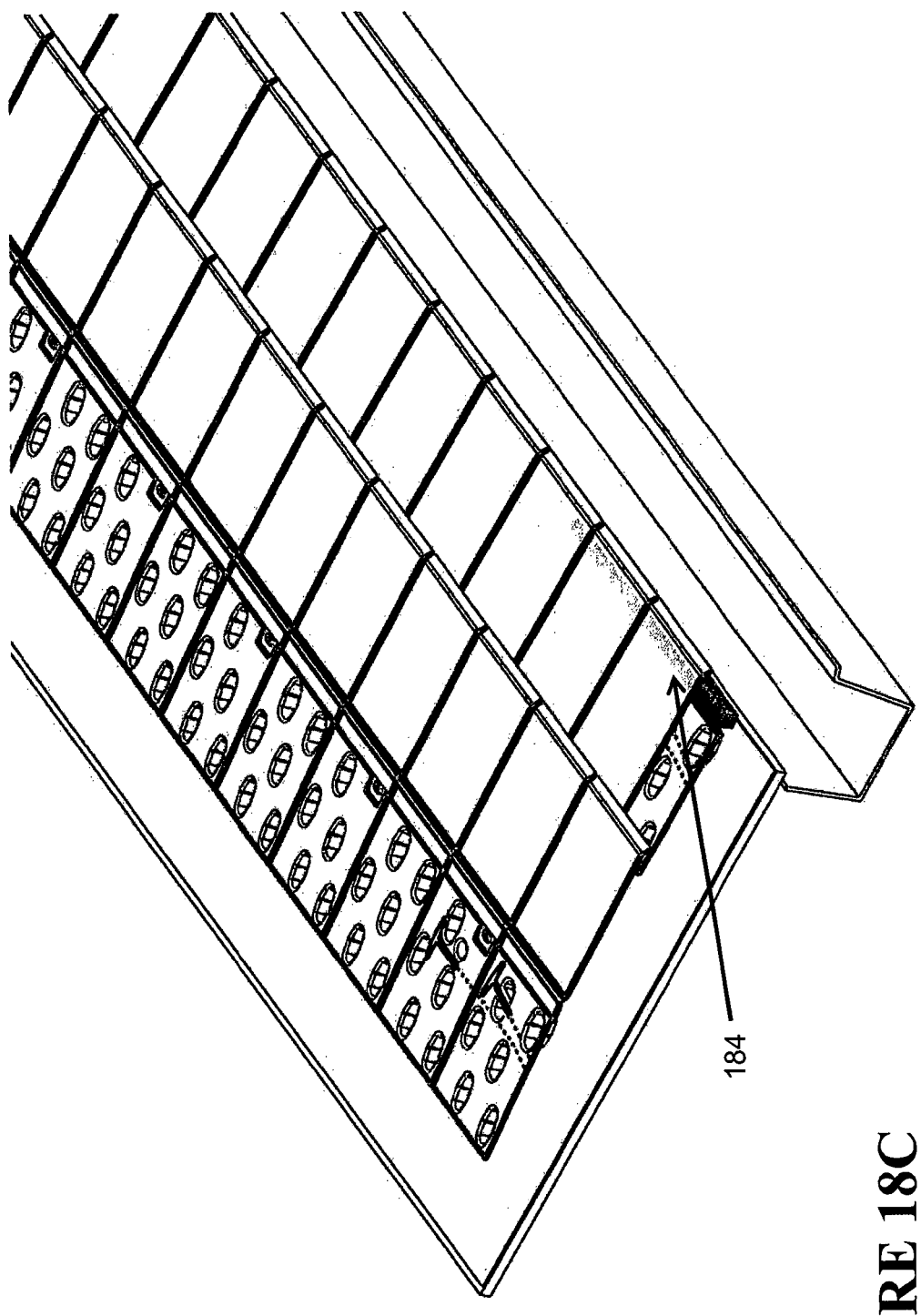

As an example of such a system, FIG. 17 shows a roof assembly involving a series of overlapping shingle modules. FIG. 18A shows an illustrative embodiment of two modules from side on. The roofing underlay, such as a plywood surface and/or a weatherproofing, insulating or highly reflective membrane 171, and the layer of roofing shingle will be slightly set off from the membrane so that there is a gap 181 to allow the passage of an air stream between the two layers. The gap can be maintained by features of shape integral to the shingle module moulding 182 or by additional spacer/standoff components. Thus, the roof assembly forms a single layer on top of the building underlay but the formed features 182 (i.e., the profiled "feet" on the underside of the underlapping region) make the stand-off for the air to pass through. FIGS. 18B and 18C illustrates a tile at the edge of the building surface and shows that a filter 184 can be placed between the tile and the building underlay to allow for the passage of air from the outside into the set off. It is most efficient to force the air in the direction which it would naturally travel as it gets hotter, i.e. from the bottom of the building surface to the top; however alternative embodiments where the air is drawn across the surface may also be conceived. The warm air can then be drawn through inlet spigots 172 near the upper edge of the surface into a central manifold duct 173. The warm air can be exhausted directly to the atmosphere or used elsewhere in the building.

Figure 19:
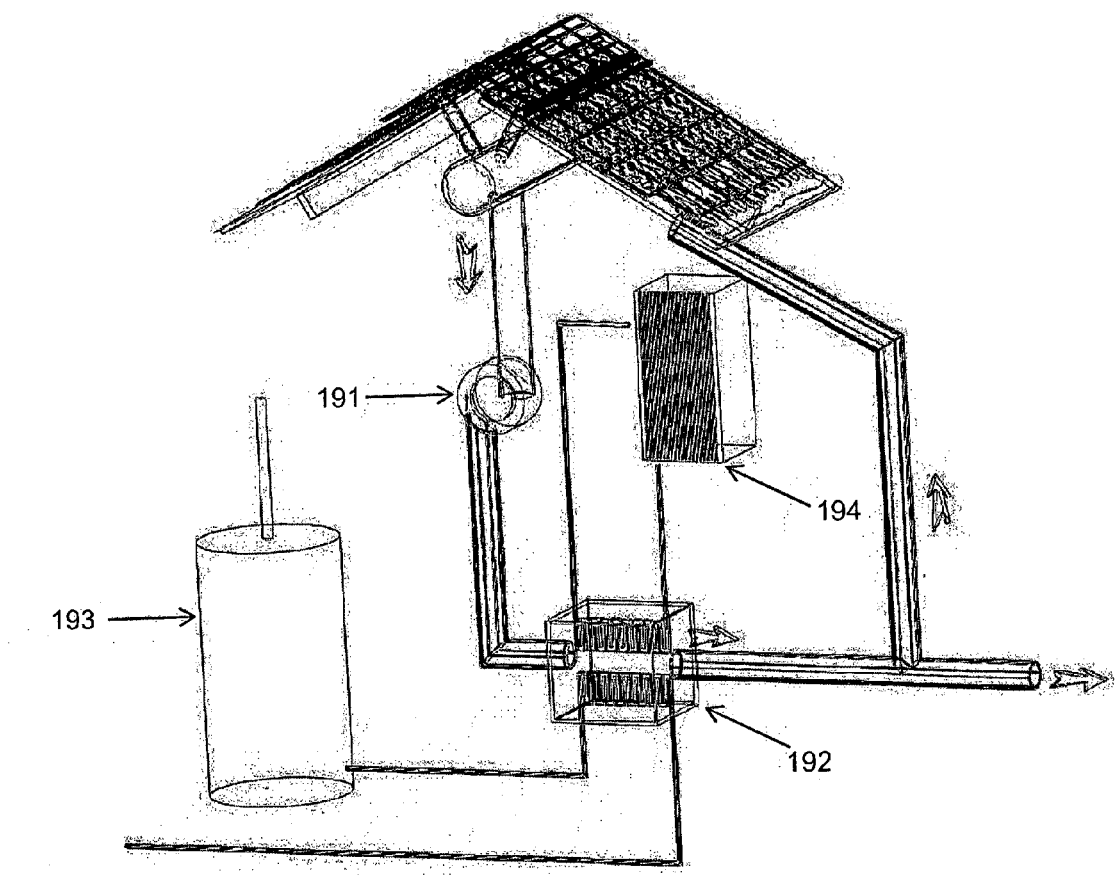
FIG. 19 is a diagram showing how heat recovered from the roofing system can be collected and used.

FIG. 19 shows how the energy from the warmed air can be used elsewhere in the building. A fan 191 can be used to create airflow to pull the air into the manifold duct. The warmed air can then be expelled from the fan and used as the working fluid of a heat exchanger 192 which can be employed as required, for example in water heating 193 or air conditioning 194. Alternatively the hot air can be directly used for heating applications. A flap valve (not shown) may be installed to release hot air from the manifold duct in the event that the fan fails. In some embodiments, the airflow is reversible, such that warm air can be directed from the heat exchanger to the roof in order to, for example, melt snow or ice on the roof, purge residual moisture, or clear dust, dirt, or debris from the system. Different manifolds may also be included to direct warm air from one part of the roof to another depending on the energy need. For example, air may be directed from a sun-exposed portion of the roof to a shaded, snow-covered portion in order to melt snow from that portion. Other variations would be readily apparent to one of skill in the art.

In some embodiments, the speed of the fan is proportional to the thermal energy received in a particular area of the roof. The fan speed can be controlled in a variety of ways, including temperature sensors or timers. In one embodiment, the fan speed is controlled by driving the electric motor using one or more dedicated PV cells on the surface of the roof. Thus, the fan control will be directly related to how hot and/or intense the sun is on certain parts of the roof at different times of the day. For example, a building surface may be divided into sections in which separate fans control airflow in each section, e.g. a standard house might have four sections and each would have its own fan which would increase in speed as the intensity of the sun increases on that side of the roof and decrease in intensity as the sunlight intensity decreases. As such, the fans in the different sections will be increasing and decreasing in speed depending on whether the particular section is in full sun or is partially shaded.

In one embodiment, a thermal embodiment of the module can be moulded or profiled with a raised patterning 211 in the underlapping region to define a tortuous pathway above the actual or notional plane. This causes turbulence in the flow of the forced fluid and therefore increases the convective heat transfer from the module to the flowing fluid. As described in detail in the next section, when PV functionalities are included on the module, the feet also provide a passageway for the wiring for electrical connection, e.g. to the PV cells, and allow for the incorporation of electronics into the shingle. The feet may be designed to also provide strength so that if a person walks on the shingle it will not crush or fold under. The feet may also be designed to provide an even airflow across the entire airway space. The feet may also be designed to provide a minimal pressure drop between the air intake and the air outlet. The feet may also be designed to provide for the location and securing of cables and Tee fittings. The feet may also be designed to provide a pathway for the cables and Tee fittings that has minimal obstruction. The pathway for the cables may be vertical, horizontal or diagonal.

Figure 21A:
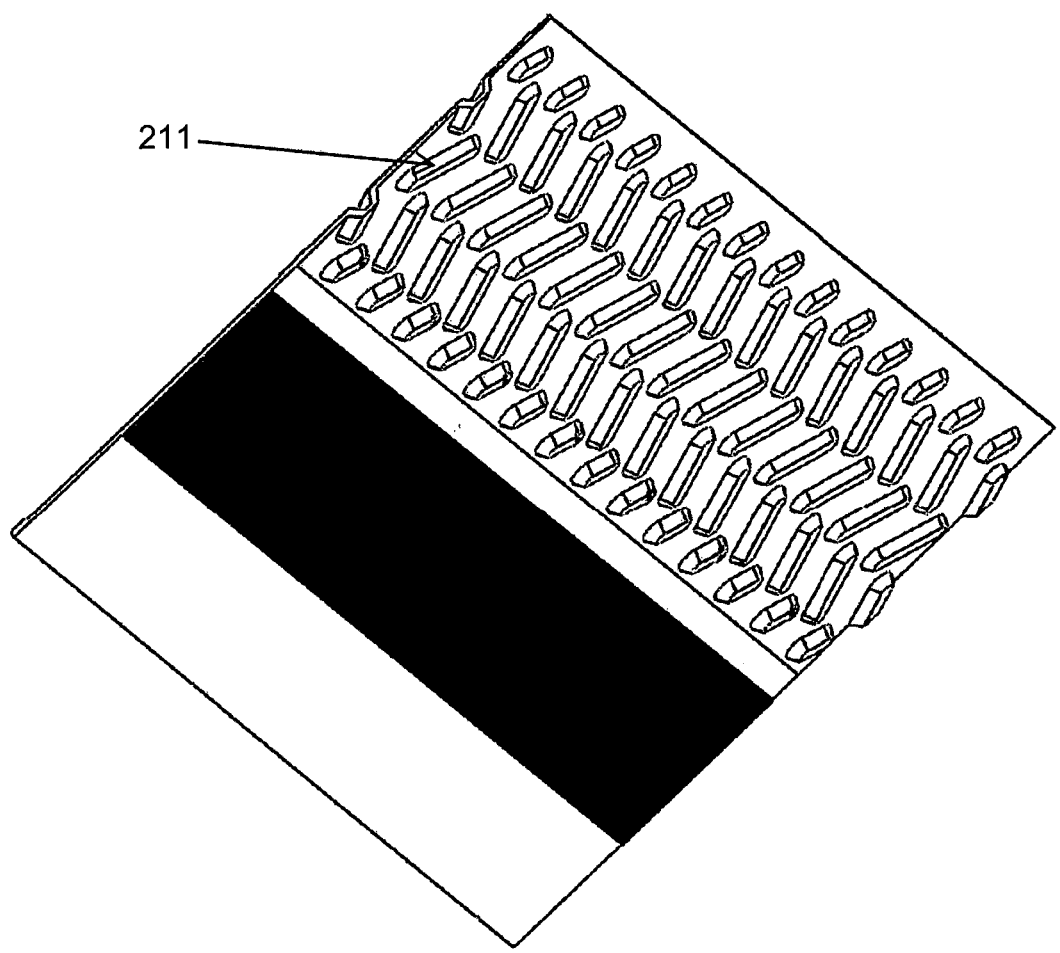
FIG. 21A shows the underside of a module with projection features included to encourage turbulent flow of the underpassing air stream.
Figure 21B:
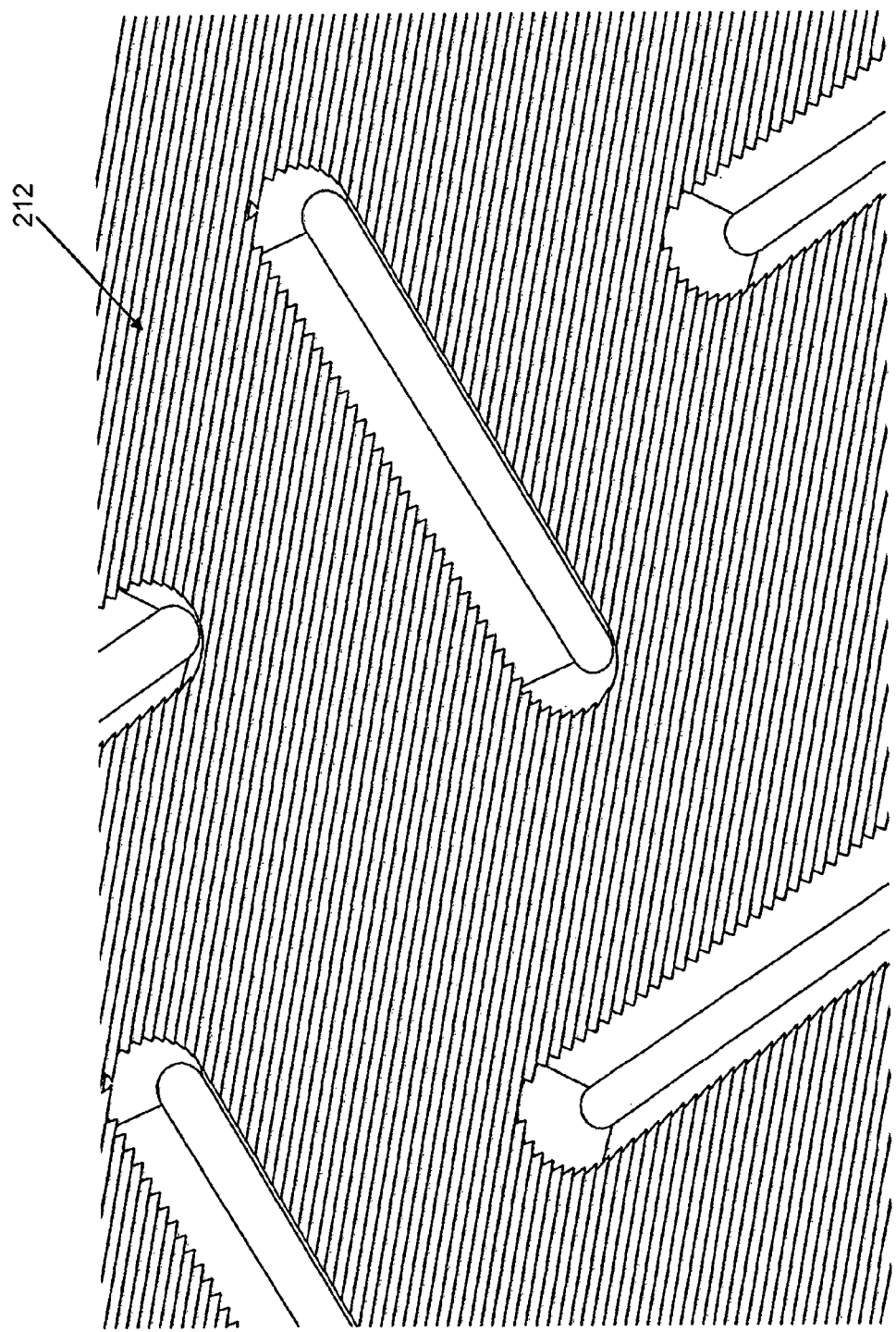
FIG. 21B shows a module surface (as seen in FIG. 21A) with a series of fine ribs integral to the moulding so as to increase the module's contact surface with the air stream and assist heat transfer.
Figure 21C:
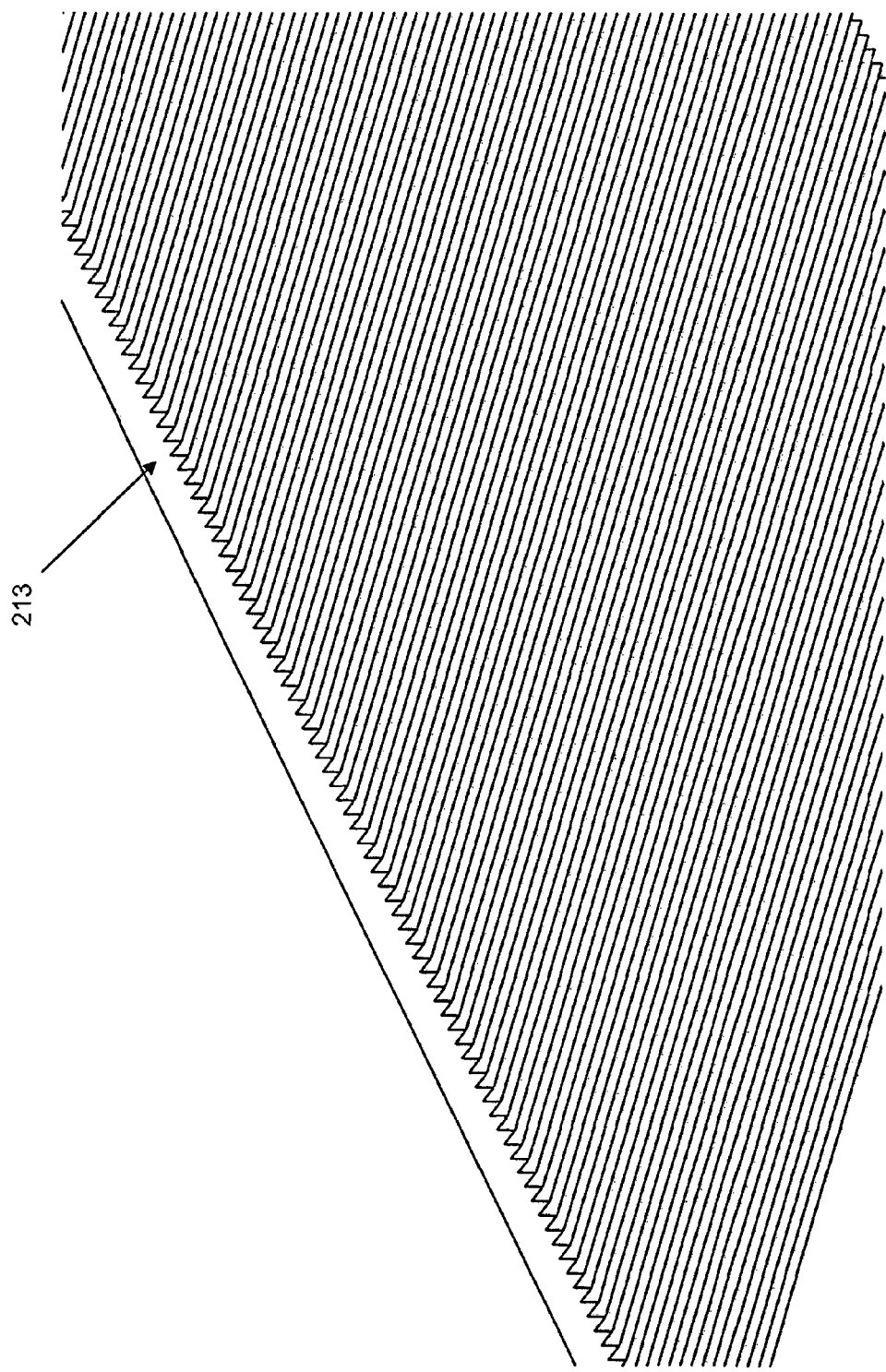
FIG. 21C is a close up view showing the profile of the ribs of FIG. 21B.

There are many different patterns which will achieve this, including the alternating pattern of mesa-like projections shown in FIG. 21. Again the proportion of the shingle which is patterned may vary in comparison to the size of the underlapping region. The projections on the underside of the module need not be the same across the entire width. In one embodiment, the projections decrease in height as one moves across the width of the tile such that there is a taper between the building surface and the underlapping region of the module. Therefore, when an overlapping module is placed on top, it is kept parallel to the building surface. For example, the projections may reduce in size from about 21 mm to about 16 mm as one moves towards the back of the tile to make it easier to fit the overlapping tile and keep the overlapping tile parallel to the building surface. The shape and layout of the projections may also vary.

In another embodiment, the patterning is in the form of a corrugation between the module and the building surface. For example, the module can be moulded into alternating parallel grooves and ridges.

Figure 20:
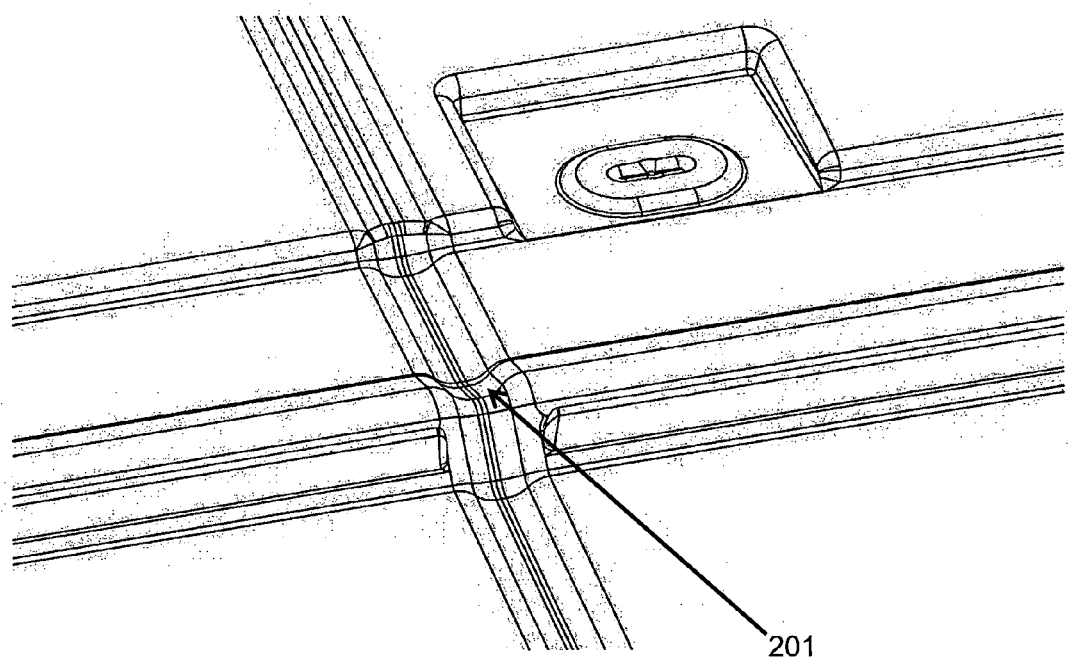
FIG. 20 shows a cross section of a profiled feature moulded as part of the underlapping region of a module.

FIG. 20 shows how the profiles may have chamfered sides 201 or other features of shape to prevent water from gravity pooling in the depressions when the underlying surface on which the product is installed is an angled surface (for example a roof). A series of fine ribs 212 moulded on the underside of the module, or roughened surface texture, could alternatively or additionally be used to create turbulence in the air flow. This will also create more surface area for conductive heat transfer from the module. In some embodiments, the geometry of the ribs or texturing can be chosen to assist in heat transfer. For example, if the texture is, in profile, a series of triangular peaks 213, this will allow more efficient heat transfer to the passing air flow than if the texture is, in profile, a series of square toothed projections.

Figure 22:
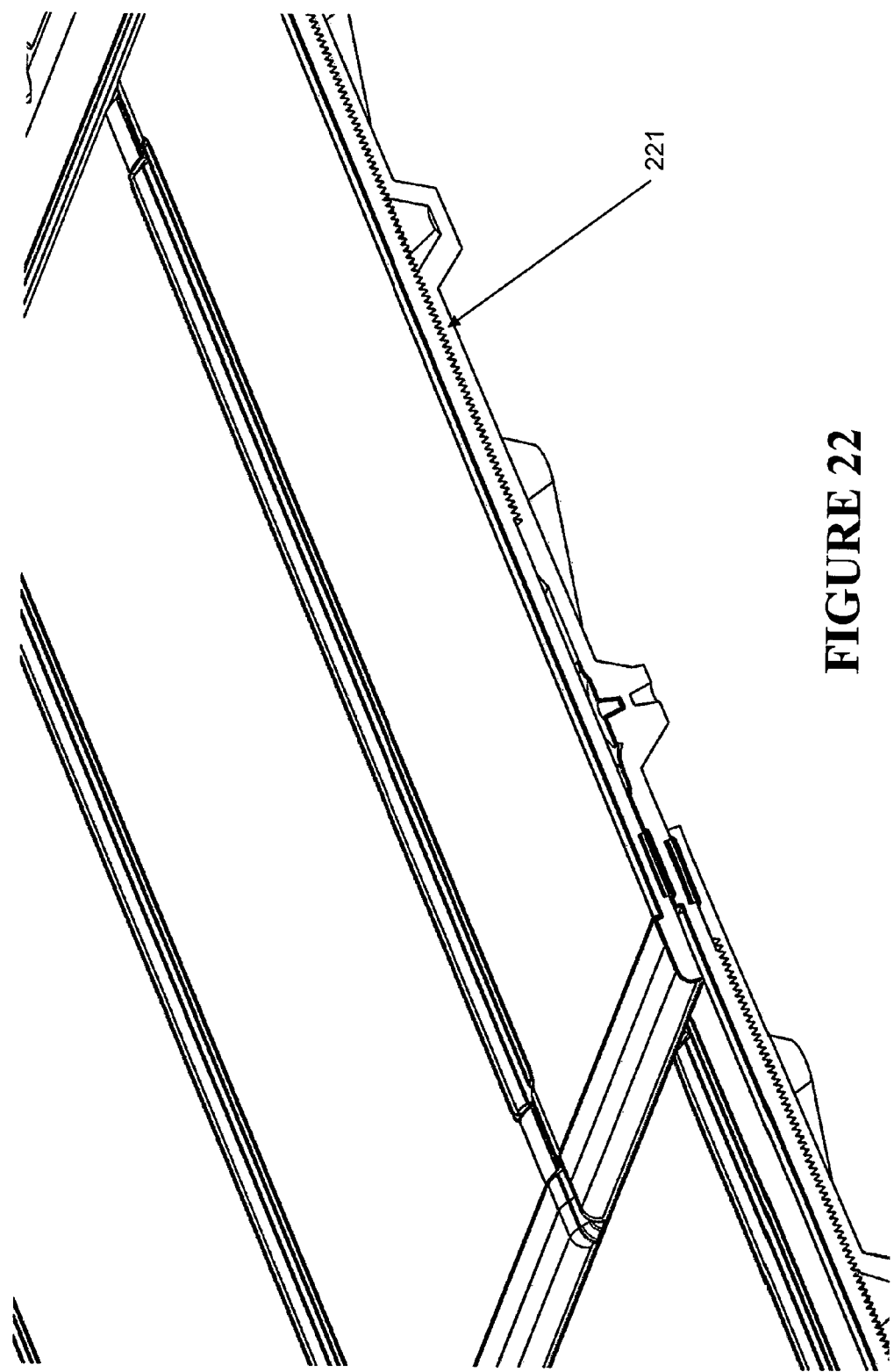
FIG. 22 shows two modules positioned in a lapping arrangement and having complementary surface textures on their respective contact surfaces.

As a further option, the surfaces which come into contact when lapping could have complementary texturing on them to assist their interengagement; for example, as shown in FIG. 22. A thermally conductive paste or adhesive may additionally or alternatively be applied between the contact surfaces to enhance this, or the adhesive strip feature may be thermally conductive or have a thermally conductive component. In one embodiment, the upper and lower surfaces of the under and overlapping modules respectively have a serrated profile 221 capable of interlocking when the modules are in position. The serrations can be shaped so that they "wedge" into each other and exert some degree of compressive force against one another. The surface textures might otherwise be splines, knurls, teeth or undulations of another type. The texturing brings the surfaces into better contact so that there is more surface area to facilitate heat transfer between the lapping modules, and could also be used to aid in locating the modules when they are installed on a building surface.

Although foamed materials reduce the cost and weight of the product, the air inside the foam acts as a heat insulator. This can be advantageous if you want to stop heat from the sun being transferred into the ceiling cavity of the building, but it is not ideal for heat transfer in an energy recovery system. Therefore the thermal embodiment of the roofing and/or cladding product may be adapted to increase its heat transfer capacity. In order to achieve a foamed material with high heat conductivity, thermally conductive particles (e.g. aluminium flakes) can be introduced into a polymer prior to the forming process. The particles help to create a heat pathway through the material and increase the overall thermal conductivity significantly. The particles may also provide structural reinforcement to the material. For example, where a module moulded from polycarbonate may have a thermal conductivity of 21 W/mK, the same module moulded from a loaded polycarbonate blend having 30% aluminium will have a thermal conductivity of 25 W/mK. A module moulded from 3% foamed polycarbonate may have an even lower thermal conductivity of 18 W/mK, but this can be improved to 24 W/mK with the addition of 30% aluminium. The module material can be loaded with the thermally conductive substance prior to the manufacture of the module.

In order to prevent the final product from being too brittle, a compatiblising polymer, such as an ionomer, can be blended with the metal particles changing them from a reactive contaminant to a reinforcement agent with elevated levels of thermal conductivity. It is desirable to have some degree of elasticity to the formed material for use in building product applications.

Another embodiment of the roofing and/or cladding product of the current invention is that which is adapted for use in a system to generate electrical energy from solar power. Such products are generally referred to as building integrated photovoltaic products ("BIPV"). As shown in FIG. 23, a series or array of photovoltaic cells may be carried on the exposed region of the module so that they capture photons when installed on a building surface.

Figure 24:
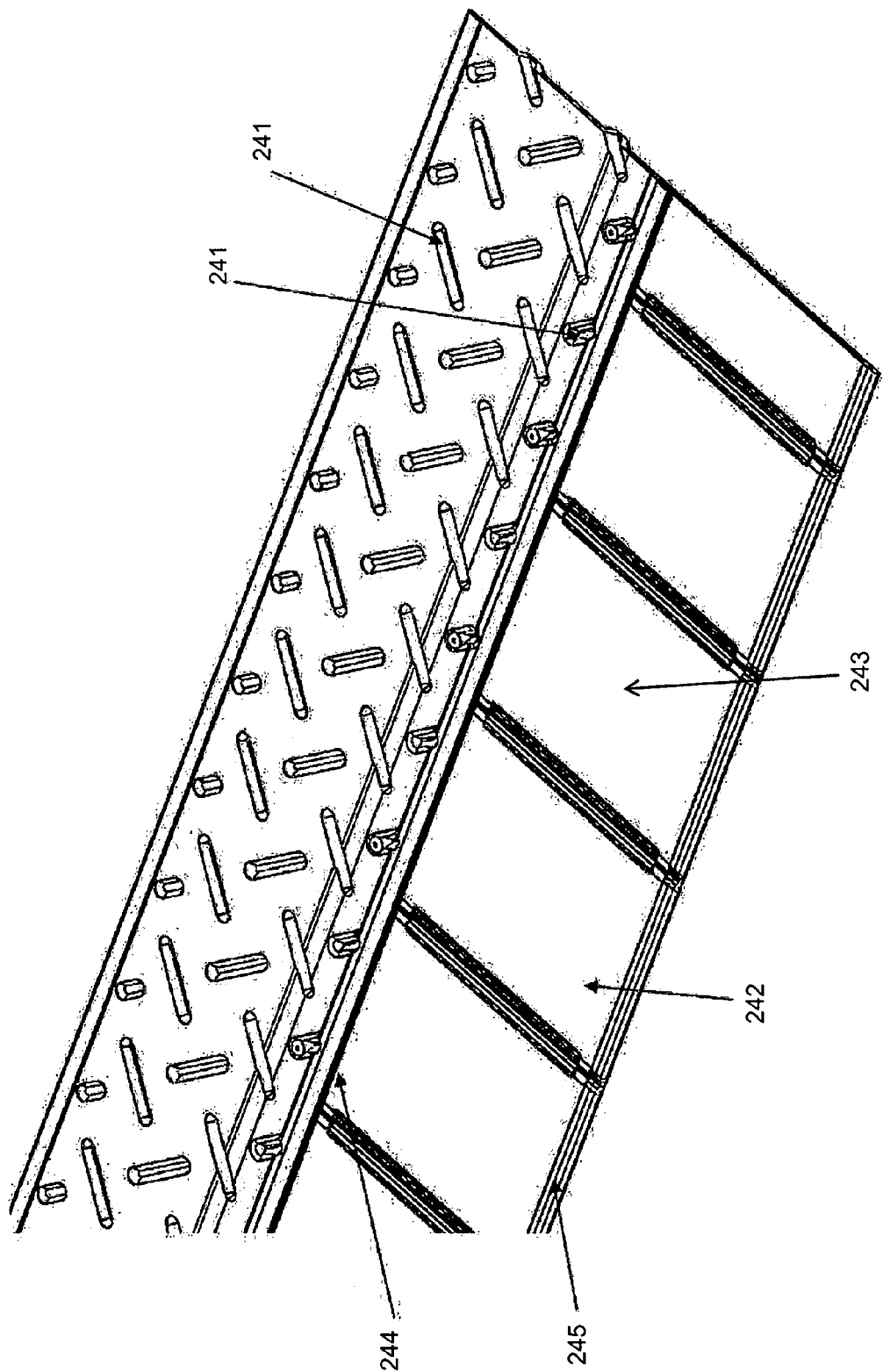
FIG. 24 is a detailed view of the module of FIG. 23.

FIG. 24 shows a more detailed view of an energy generating module, which may comprise one or more moulded material layers 241, a solar array layer of connected photovoltaic cells 242, and an optional transparent surface laminate layer 243. The energy generating module may also comprise bonding/encapsulation/tie layers to the front and/or back of the PV layer and may also contain layers to stop the corrosion of the PV layer e.g. polyethylene, EFTE, etc. On the solar array layer, typically or optionally each of the photovoltaic cells in the row are connected via two bus strips which extend the entire length of the module; one running across the upper edges of the cells 244 and one running across the lower edges 245. The advantage of this is that the bus strips contact all of the cells so that only a single electrical junction for each module need be connected to a main power take-off on installation. A further option is to have the bus strip material integrally moulded into the substrate panel during the forming process.

Figure 11B:
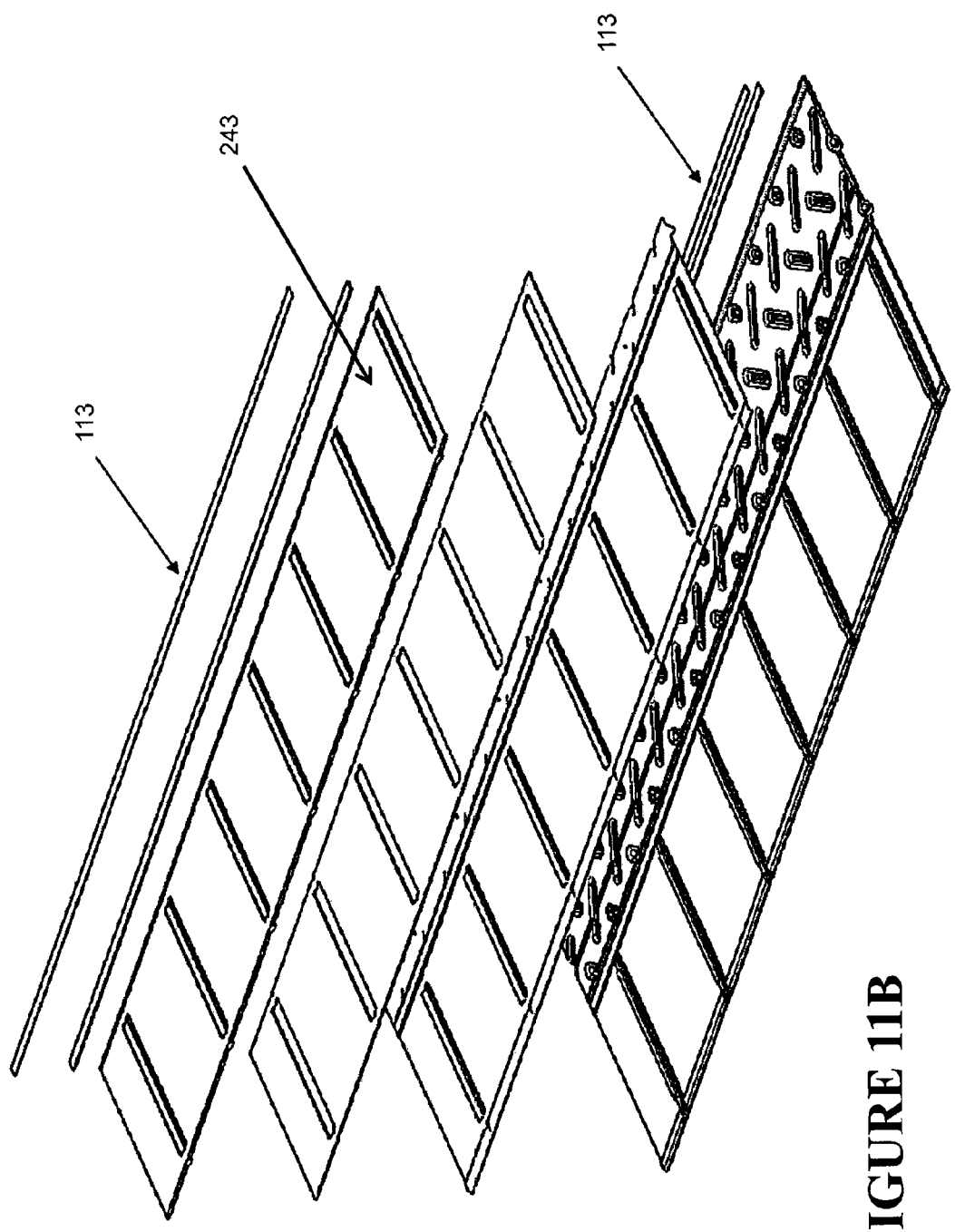
FIG. 11B shows an exploded view of the module of FIG. 11A.
Figure 25:
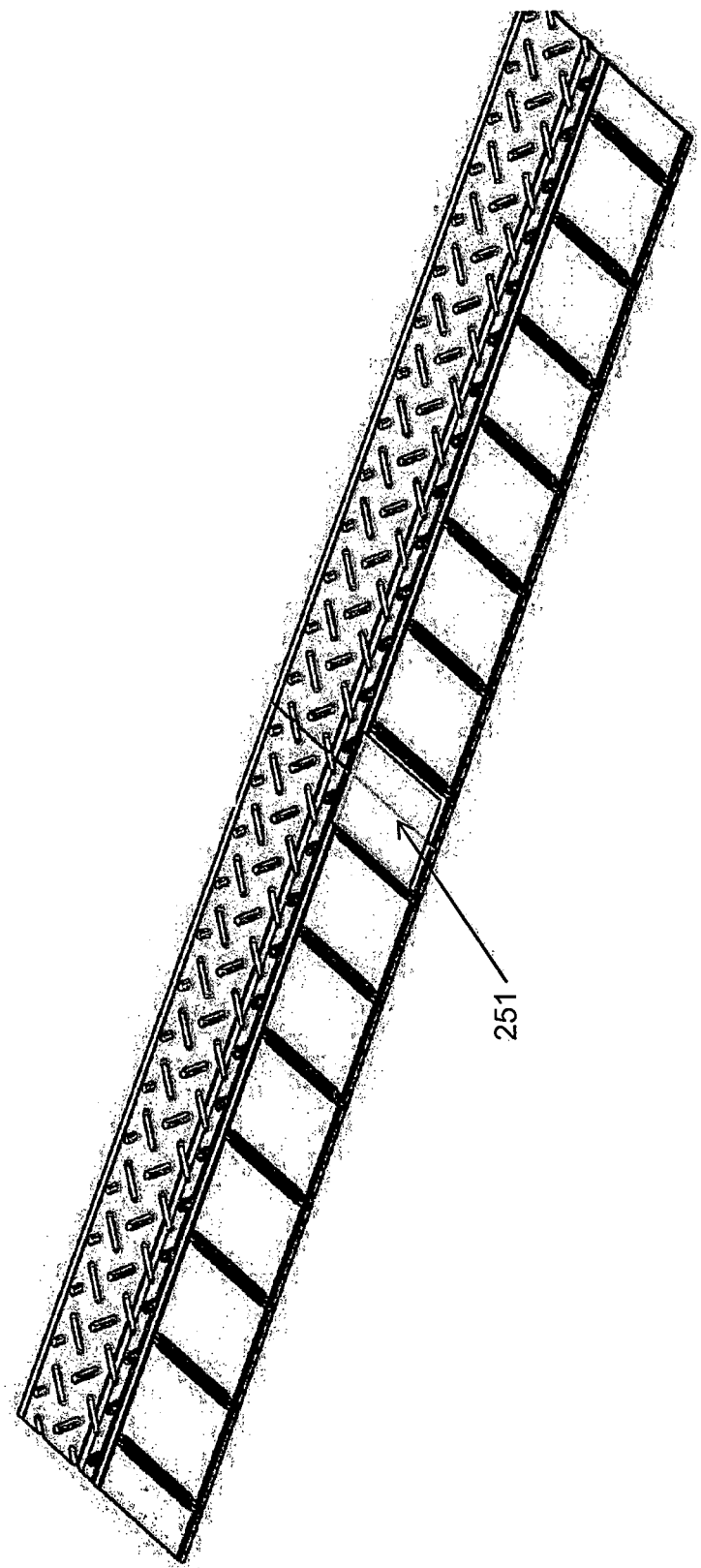
FIG. 25 shows a method of endwise joining two modules with an overlaid solar panel secured across the joining region.

FIG. 11B shows an exploded view of all of the layers of an illustrative BIPV product. The transparent laminate 243 is over a solar array layer of connected photovoltaic cells 242, which is over a moulded material layer 241. The release sheet 113 of an adhesive strip 121 are also shown. Optional adhesive, tie, or bonding layers (not shown) may be added to the surface of any of the layers.

Where it is necessary to join two modules across the width of a surface (i.e. the electrical join is not at the main power take-off junction, but between two modules), the method shown in FIG. 25 can be used. The modules may be positioned end on end and then an extra cell 251 can be placed over the discontinuity to create an electrical connection between the modules while also visually concealing the physical join line for improved aesthetics.

Figure 30:
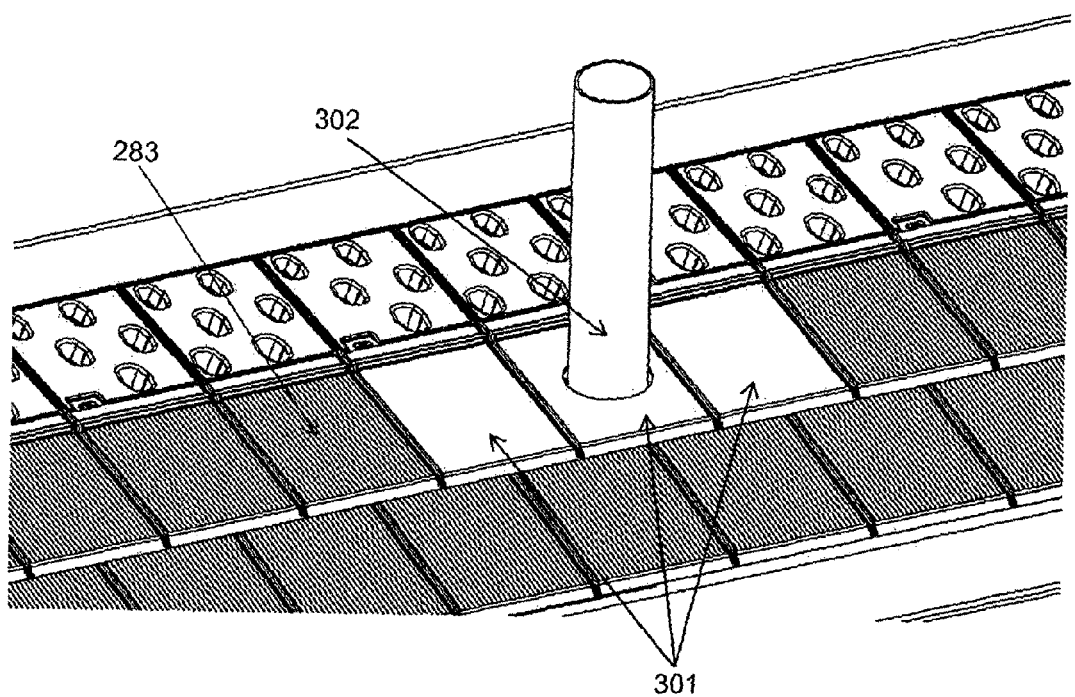
FIG. 30 shows a "dummy" module positioned in a lapping arrangement with a cutout for a pipe emerging from the building surface. BIPV modules are shown on either side of the "dummy module".

The BIPV system may incorporate one or more "dummy" cells at various locations across the surface of the roof. In a suitable embodiment, the dummy cells will look identical to the rest of the PV cells but will have no functionality. Because the dummy cell is not active, it can be cut to fit the shape/space required and can be penetrated safely if necessary. As shown in FIG. 30, two "dummy" modules 301 are positioned in a lapping arrangement with a cutout for a pipe 302 emerging from the building surface. BIPV modules 283 are shown on either side of the "dummy module. In addition, dummy cells may be positioned at the ends of the building surface or may be positioned at predetermined locations to provide for the installation of various building features (satellite receivers, antennas, pipes, etc.). One advantage of the dummy cells is that they age identically to the rest of the PV cells and therefore the entire roof surface maintains consistent aesthetic features over time. In some embodiments, the dummy cells may be scribed with markings that indicate that these cells can be safely penetrated, e.g., for the installation of hardware or for fire safety.

The modules may be suitably joined by an overlapping module (for weatherproofing) or an adhesive pad which extends across the join and contacts the underside surfaces of both modules. It may also be necessary to add a similar adhesive pad to the top side surfaces, or to smear the reverse side of the joining cell with an adhesive paste to secure the join.

Figure 26A:
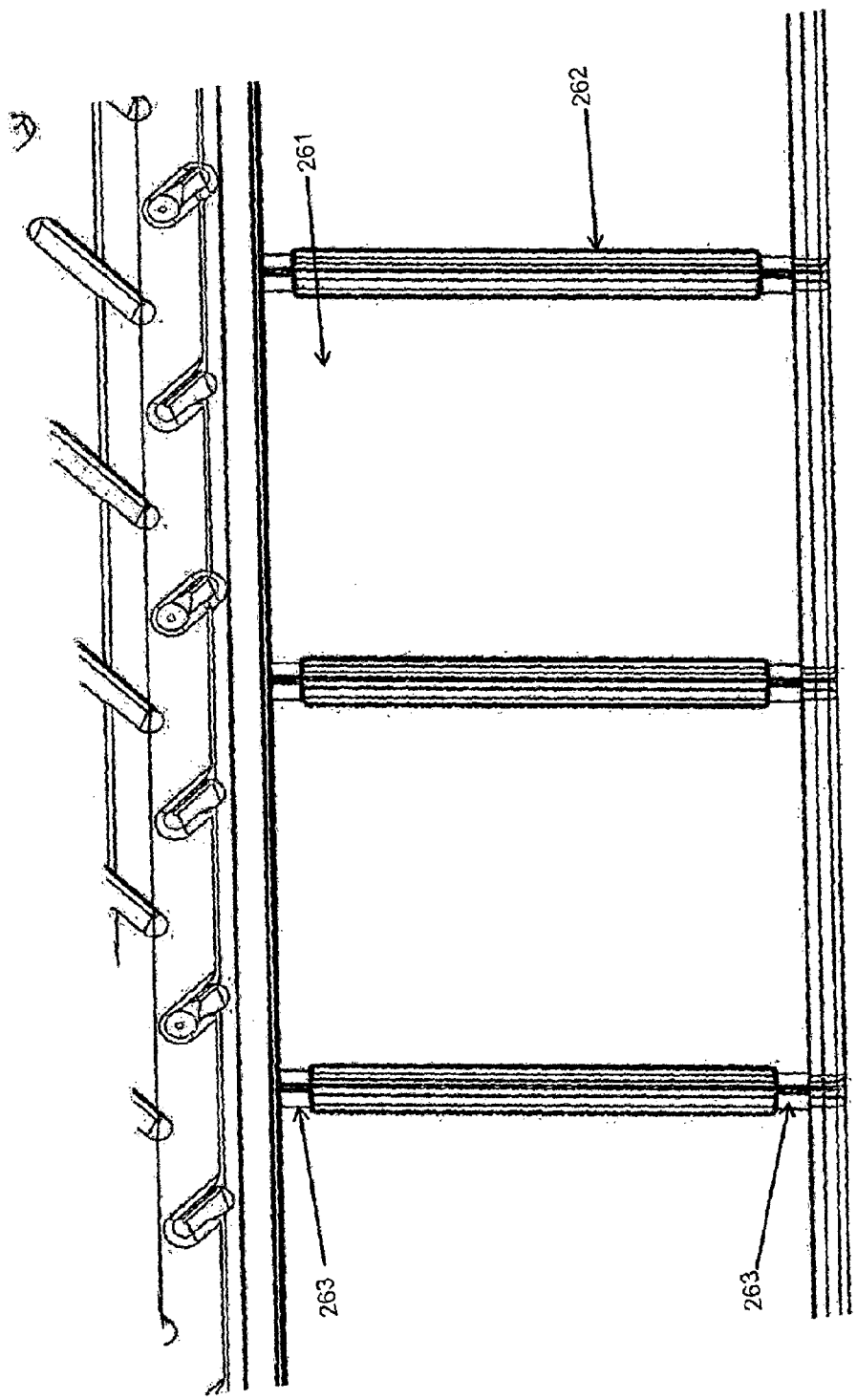
FIG. 26A shows the detail of the relief features on the surface of the building integrated photovoltaic embodiment of the module which are designed to locate a series of electrically connected photovoltaic cells.

While the PV cells could simply be placed on any top surface of a module, in some embodiments the module is formed with a number of relief features on its upper surface to locate and register the PV cells. These can be more clearly seen in FIG. 26A. There are recessed panels or pockets 261 in the cell bearing portion of the shingle modules which locate each individual cell, and these are separated by raised or recessed channels 262. The channels create the impression of "tiled" roofing, and generally add to the aesthetics of the product. Regions at the top and bottom of the channels 263 provide space for the bus strips to pass through between each pocket. It may be desirable that these regions are less raised or lowered than the other parts of the channel so that the bus strip does not have to be bent excessively when it is adhered to the contours of the module substrate.

The exposed portion of the solar cell carrying module may be profiled with two (or more) rows of pocketing so as to accommodate two (or more) rows of solar cells upon a single module. In such a case there will provision to locate a set of bus strips for each row, or the profiling may provide for the location of a shared bus strip(s) to be positioned between the rows.

Figure 26B:
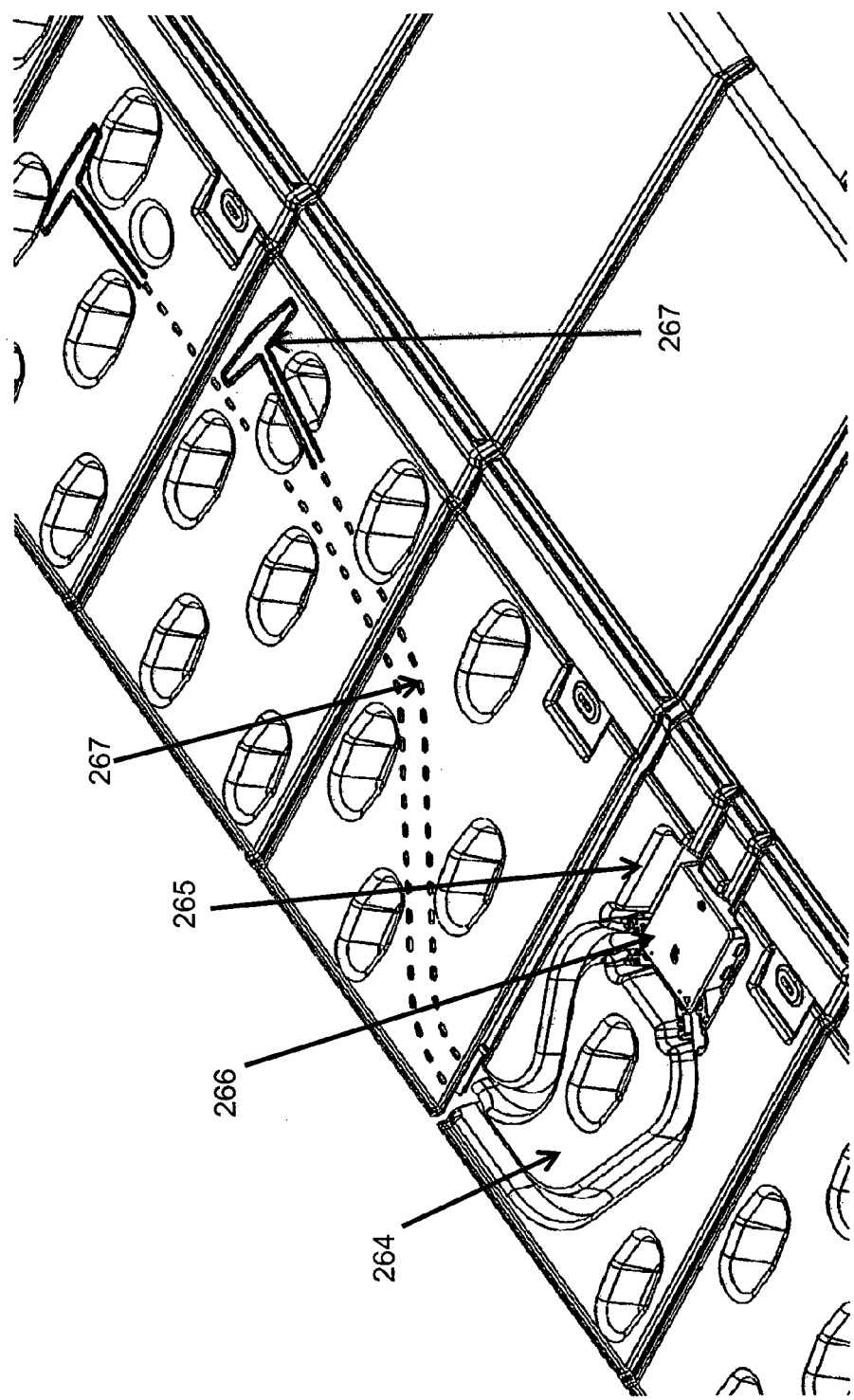
FIG. 26B shows the detail of the channels configured to receive cables or wires of the photovoltaic array cavities configured to receive junction boxes. This figure also shows surface marking to indicate the location position of the underlying electrical fittings and connections.

The modules may be molded to accommodate various components of the photovoltaic system. For example, as shown in FIG. 26B, the upper surface of the underlapping region may include channels 264 configured to receive cables or wires of the photovoltaic array. Moreover, the upper surface of the underlapping region may also include formed cavities 265 configured to receive junction boxes 266, printed circuit boards (PCB), communication devices, cables, wires, buses, components, cells, or diodes, and the like of the photovoltaic array. Thus, the modules may contain all of the hardware and software required to connect and regulate the PV cells. Because there are no penetrations between the two overlapping modules, the assembly can be completely waterproofed. Furthermore, the upper surface of the exposed region may contain scribings or markings, such as an impression or line corresponding to the molded cavities, thus informing an installer or repair person that various components are located in the space below. The upper surface of the underlapping region may also include formed markings 267 to indicate the correct location of wires and Tee connections for wires, that are located in the pathway for airflow 181 underneath the underside of the underlapping region.

With the modules installed as shown in FIG. 23 most of cell bearing portion of the module is exposed while the rest of the module, including the fixing region and fastening means is completely covered by neighbouring modules. This enables maximum power generation but still provides some degree of protection for the fastenings to reduce their rate of degradation and corrosion. The upper electrical bus strip is also protected by the front edge of the overlapping panel for both weather and aesthetic reasons. Furthermore, because there are no penetrations that traverse the entire thickness of the roofing material, this product overcomes the limitations of existing solar products, which penetrate the roof membrane with bolts, screws, or nails that must be caulked and can leak. Wires 231 can also run between the bottom of the module and the weatherproof underlay without penetrating the underlay (as shown in FIG. 23).

Figure 27:
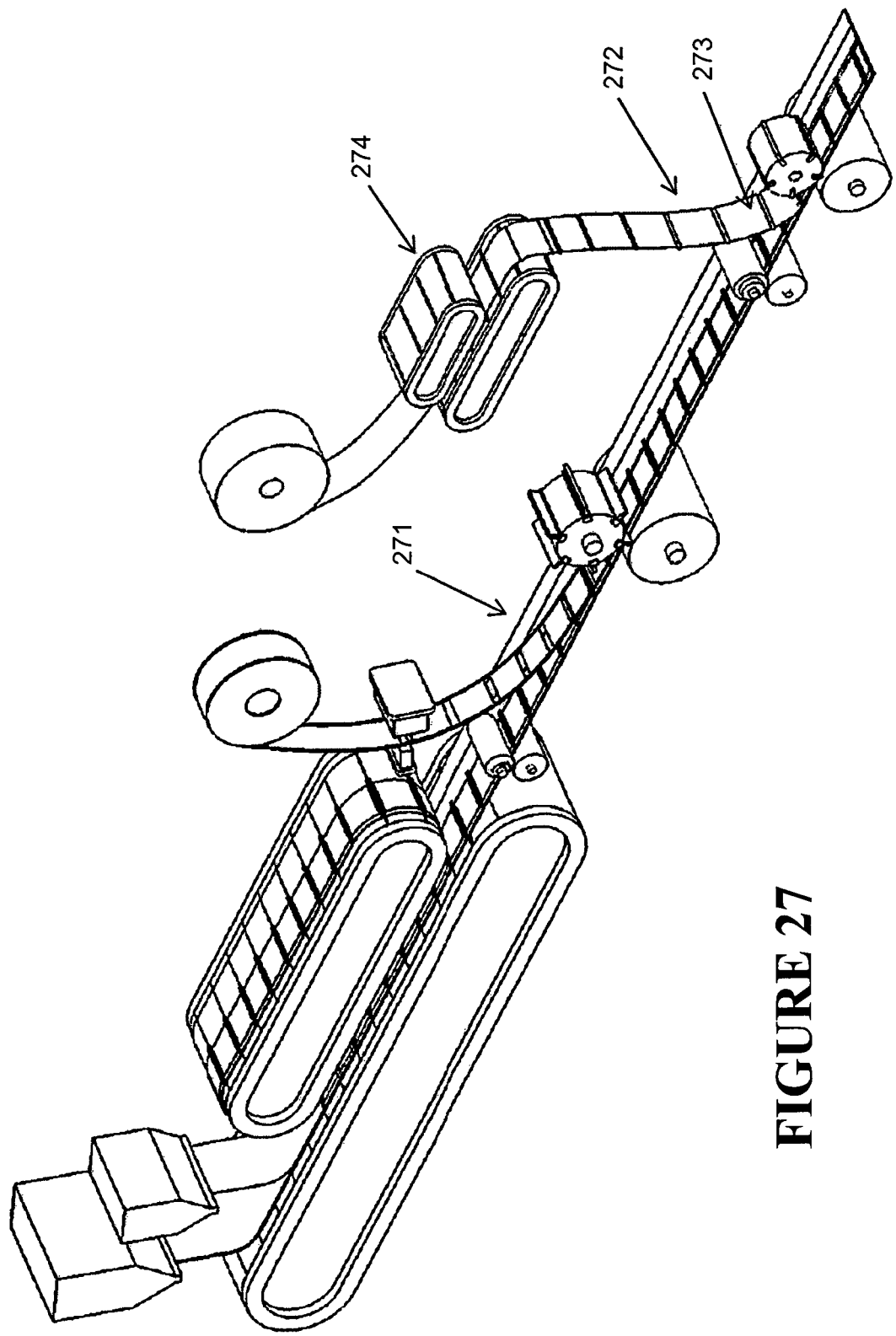
FIG. 27 shows diagrammatically a continuous forming apparatus contemplated as providing for the continuous forming of modules and lending itself to the online introduction downstream of a photovoltaic functionality system.

The process by which the solar version of the roofing product can be continuously manufactured is shown in FIG. 27. The first, second and third steps of preparing, presenting and forming the module are the same as those described previously, however the fourth step 271 is the application of the solar array and the optional fifth step 272 is the application of a laminate layer over the solar cells which may have bonding between layers or adhesive layers between them.

Once the module has been formed the PV cells can be deposited on top in such a way as to be located by the relief features on the upper surface. FIG. 27 shows the PV cells being fed onto the substrate from a continuous roll feed. In this case the upper and lower bus bars would need to be associated with the cells in a prior step to form the roll. Another option is to deposit the cells individually into the pocketed relief features of the substrate and to subsequently apply the bus bars (possibly separated by a spacing web) from a separate roll feed. Yet another option is to feed the bus bars onto the substrate and then overlay the solar cells.

An optional step is to apply a transparent laminate 273 to protect the cells. It is convenient to pre-form (also by continuous moulding 274) and apply the laminate in-line, as shown in FIG. 26, so that the addition of this layer can occur without any increase in the overall production cycle time. This can be laminated with some degree of electrostatic or adhesive binding to increase adhesion. While a variety of materials may be suitable as the laminate, a suitable material is fluoropolymer. Ethylene tetrafluoroethylene (ETFE) is an example of an appropriate fluoropolymer, but other polymers able to remain optically transparent may also be used. The fluoropolymer creates an essentially "self cleaning" top surface so that performance of the PV cells is not inhibited by deposits of dirt and debris. Fluoropolymer is also very stable in ultraviolet light and usually retains its light transmitting capacity for longer than glass, which is another commonly used material in PV applications. It is preferable to choose a material which would be able to maintain light transmission during long periods (approximately 10-25 years) of environmental exposure. The laminate is applied also over region 117 to cover parts of the panel which are not directly exposed to light but which will receive reflected light. This laminate also gives superior durability to the exposed outer area of the panel and may be used even without PV cells to provide greater long term durability.

Figure 28:
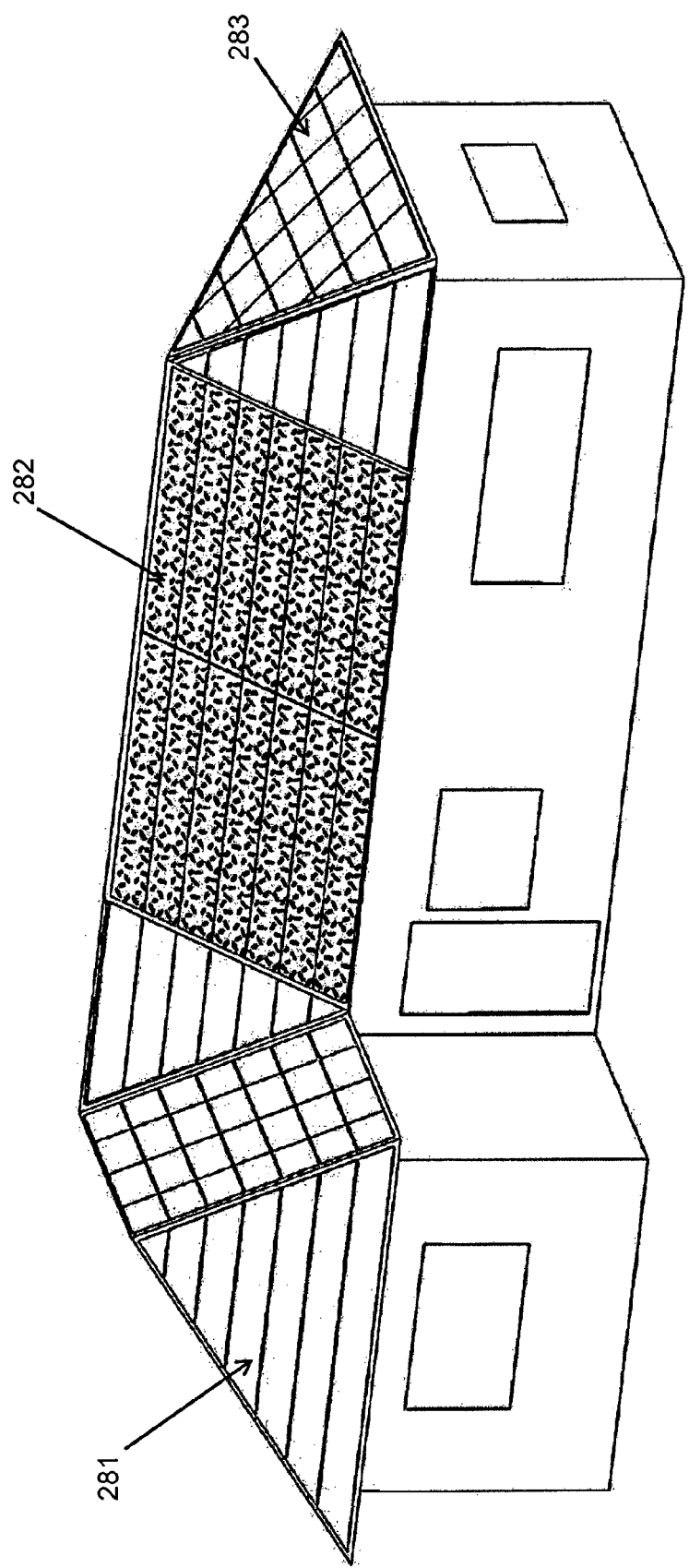
FIG. 28 shows a building on which various embodiments of the current invention have been installed.

In another aspect, the present invention provides a building integrated photovoltaic system which allows combined solar, ambient and solar-generated heat to be collected and directed away from a building surface and optionally used elsewhere. For instance, the photovoltaic cells of the energy generating module could heat up during operation. As well as potentially causing the interior of the building to heat up as a result, the cells will also perform less efficiently as they grow hotter. A further issue is that the material around the cells will tend to expand due to the heat and this can generate stresses and/or movement that may eventually lead to product failure. Therefore, there is an added advantage in combining the features of the BIPV product with those of the thermal product, and using the hybrid module as part of a system which generates electrical energy while also allowing heat energy to be transferred away from the solar cells, recovered, and put to use as desired. FIG. 28 shows a building on which the non-energy harvesting product 281, the thermal product 282 and the BIPV product 283 have all been installed at different regions of the same building according to energy and cooling requirements.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 units refers to groups having 1, 2, or 3 units. Similarly, a group having 1-5 units refers to groups having 1, 2, 3, 4, or 5 units, and so forth.

All references cited herein are incorporated by reference in their entireties and for all purposes to the same extent as if each individual publication, patent, or patent application was specifically and individually incorporated by reference in its entirety for all purposes.

The invention claimed is:

1. A roofing, cladding, or siding module comprising:
   an underlapping region and an exposed region, wherein the underlapping region is adapted to be substantially covered by the exposed region of an adjacent module when installed on a building surface; and
   an outer surface and an under surface, wherein the under surface of the underlapping region is profiled to define a pathway for air flow between the module and the building surface;
   wherein the profile of the under surface of the underlapping region is patterned in a manner to (A) create turbulence in the air flow, or (B) increase the surface area of the module in contact with the passing air flow compared to a module lacking such a surface pattern, or both (A) and (B);
   wherein the profile of the under surface of the underlapping region comprises a plurality of projections extending from said under surface to the actual or a notional plane of the building surface when installed, such that the projections create a tortuous pathway between the module and the actual or the notional plane of the building surface;
   wherein the plurality of projections at least in part define the profile of the under surface of the underlapping region and are arranged to form the pattern thereon;
   wherein at least one of said plurality of projections is defined by a recess in the outer surface of the underlapping region, said recess configured as a fixing region for receipt of a fastener for securing said module to the building surface;
   wherein the entirety or at least a substantial part of the under surface of the underlapping region is patterned; and wherein the under surface of the exposed region is devoid of projections.

2. The module of claim 1, wherein the outer surface of the exposed region comprises a photovoltaic cell or device.

3. The module of claim 2, wherein a solar radiation transmissible film is overlaid upon the photovoltaic cell.

4. The module of claim 1, wherein the module is moulded by thermoforming, pressing or other method of forming, either continuously or discontinuously, wood, metal, concrete, resins, glass, clay, or composites.

5. The module of claim 1, comprising a plurality of formed surfaces moulded from one or more polymeric materials, wherein each of the formed surfaces comprise three dimensional surface features, and wherein the formed surfaces are joined without weld lines or injection moulding points.

6. The module of claim 5, wherein each formed surface is a moulded segment along the length of the module.

7. The module of claim 5, wherein each formed surface comprises an underlapping region and an exposed region, wherein the underlapping region is adapted to be substantially covered by the exposed region of an adjacent module when installed on a building surface.

8. The module of claim 1, wherein the outer surface of the exposed region comprises surface ornamentation.

9. The module of claim 8, wherein the surface ornamentation resembles asphalt shingles, slate, wooden shakes, or concrete tiles.

10. The module of claim 1, wherein the module is moulded from one or more polymeric materials.

11. The module of claim 1, wherein the module is manufactured by a continuous forming process.

12. A roofing, cladding, or siding assembly comprising a plurality of partially-overlapping modules that substantially covers a building surface, wherein each module comprises the module of claim 1.

13. The assembly of claim 12, wherein one or more of the modules comprises a photovoltaic cell or device.

14. A system for removing or recovering thermal energy from a building surface, the system comprising
a building surface;
a roofing, cladding, or siding assembly comprising a plurality of partially-overlapping modules that substantially covers the building surface, wherein each module comprises the module of claim 1; and
a fan adapted to induce the air flow.

15. A system for generating electricity and recovering or removing thermal energy from a building surface, the system comprising
a building surface;
a roofing, cladding, or siding assembly comprising a plurality of the modules of claim 1, and wherein the outer surface of the exposed region comprises one or more photovoltaic cells.

16. The system of claim 14 further comprising a vent for exhausting the air flow.

17. The system of claim 14 further comprising a heat exchanger adapted to receive the air flow.

18. The system of claim 14, wherein the air flow is induced by a fan.

19. The system of claim 14, further comprising an air filter located at the air inlet to stop foreign objects entering the airway cavity.

20. A method for removing or recovering thermal energy from a building surface, the method comprising
inducing an air flow to pass through an air passage between a building surface and an under surface of a plurality of partially-overlapping modules that substantially cover the building surface;
wherein each module comprises the module of claim 1.

21. A method for simultaneously generating electricity and recovering thermal energy from a building surface, the method comprising
inducing an air flow to pass through an air passage between a building surface and an under surface of a plurality of partially-overlapping modules that substantially cover the building surface; and
collecting electrical energy from one or more photovoltaic cells present on an exposed surface of the modules;
wherein each module comprises the module of claim 1.

22. A method of manufacture of a roofing, cladding, or siding module, the method comprising:
providing to a continuous forming machine a feed material able to assume and retain a form after being moulded between a first forming surface and a second forming surface;
allowing the formation to take place as such surfaces are advanced in the same direction;
wherein the output is a roofing, cladding, or siding module comprising:
an underlapping region and an exposed region, wherein the underlapping region is adapted to be substantially covered by the exposed region of an adjacent module when installed on a building surface; and
an outer surface and an under surface, wherein the under surface of the underlapping region is profiled to define a pathway for air flow between the module and the building surface.

23. The system of claim 14, wherein a pathway for air flow is defined between the under surface of the plurality of partially-overlapping modules and the building surface upon which said modules are located or to be attached.

24. The system of claim 23, wherein the pathway for the air flow allows for the flow of air in directions both substantially lateral and substantially transverse with respect to the building surface.

25. The system of claim 23, wherein the pathway for the air flow is a continuous pathway.

26. The system of claim 23, wherein the building surface is a substantially continuous planar surface.

27. The system of claim 23, wherein the plurality of partially-overlapping modules and the building surface define a cavity for air flow bounded on one side by an under surface of said modules and the building surface upon which said modules are located on the other side.

28. The system of claim 15, wherein a pathway for air flow is defined between the under surface of the plurality of partially-overlapping modules and the building surface upon which said modules are located or to be attached.

29. The system of claim 28, wherein the pathway for air flow allows for the flow of air in directions both substantially lateral and substantially transverse with respect to the building surface.

30. The system of claim 28, wherein the pathway for the air flow is a continuous pathway.

31. The system of claim 28, wherein the building surface is a substantially continuous planar surface.

32. The system of claim 28, wherein the plurality of partially-overlapping modules and the building surface define a cavity for air flow bounded on one side by an under surface of said modules and the building surface upon which said modules are located on the other side.

33. The system of claim 28, wherein the air flow pathway is a continuous air flow pathway.

34. A system comprising:
a building surface;
a roofing, cladding, or siding assembly comprising a plurality of partially-overlapping modules that substantially covers the building surface, wherein each module comprises the module of claim 1; and
wherein a pathway for air flow is defined between the under surface of the plurality of partially-overlapping modules and the building surface upon which said modules are located or to be attached.

35. The system of claim 34, wherein the pathway for air flow allows for the flow of air in directions both substantially lateral and substantially transverse with respect to the building surface.

36. The system of claim 34, wherein the pathway for the air flow is a continuous pathway.

37. The system of claim 34, wherein the building surface is a substantially continuous planar surface.

38. The system of claim 34, wherein the plurality of partially-overlapping modules and the building surface define a cavity for air flow bounded on one side by an under surface of said modules and the building surface upon which said modules are located on the other side.

39. The system of claim 34, wherein the air flow pathway is a continuous air flow pathway.

40. The assembly of claim 12, wherein the assembly is to be located or attached to a substantially continuous building surface.

41. The module of claim 1, wherein the plurality of projections provide an even airflow across the entire airway space.

\* \* \* \* \*